US011950741B2

(12) United States Patent
Ko

(10) Patent No.: US 11,950,741 B2
(45) Date of Patent: Apr. 9, 2024

(54) DISHWASHER

(71) Applicant: LG Electronics Inc., Seoul (KR)

(72) Inventor: Myungwon Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 17/431,803

(22) PCT Filed: Jan. 21, 2020

(86) PCT No.: PCT/KR2020/000985
§ 371 (c)(1),
(2) Date: Aug. 18, 2021

(87) PCT Pub. No.: WO2020/171394
PCT Pub. Date: Aug. 27, 2020

(65) Prior Publication Data

US 2022/0142450 A1 May 12, 2022

(30) Foreign Application Priority Data

Feb. 18, 2019 (KR) ........................ 10-2019-0018561

(51) Int. Cl.
*A47L 15/42* (2006.01)
*E05D 3/06* (2006.01)

(52) U.S. Cl.
CPC ....... *A47L 15/4261* (2013.01); *A47L 15/4265* (2013.01); *E05D 3/06* (2013.01); *E05Y 2201/686* (2013.01); *E05Y 2900/304* (2013.01)

(58) Field of Classification Search
None
See application file for complete search history.

(56) References Cited

U.S. PATENT DOCUMENTS

2015/0182101 A1 7/2015 Chae et al.

FOREIGN PATENT DOCUMENTS

| | | |
|---|---|---|
| CN | 204468001 | 7/2015 |
| EP | 0543696 | 5/1993 |
| EP | 1329175 | 7/2003 |
| EP | 2407723 | 1/2012 |
| EP | 3108791 | 12/2016 |

(Continued)

OTHER PUBLICATIONS

International Search Report in International Appln. No. PCT/KR2020/000985, dated May 21, 2020, 5 pages (with English translation).

(Continued)

*Primary Examiner* — Rita P Adhlakha
(74) *Attorney, Agent, or Firm* — Fish & Richardson P.C.

(57) ABSTRACT

A dishwasher includes a tub, a base below the tub, a door, a door bracket fastened to the door and rotatably connected to the tub, a cover panel that covers the door and the base and is movably disposed in the door, a link module that moves the cover panel in a length direction of the door, an upper holder fastened to the cover panel and movably mounted in the door, and a lower holder spaced apart from the upper holder, fastened to the cover panel, and movably mounted in the door. The door includes an upper guider that supports the upper holder guides movement of the cover panel, and a lower guider that supports the lower holder and guides movement of the cover panel. The door bracket is fastened to the door at a rear of the lower guider in which the lower holder is mounted.

14 Claims, 23 Drawing Sheets

(56) References Cited

FOREIGN PATENT DOCUMENTS

| | | |
|---|---|---|
| JP | H0847472 | 2/1996 |
| JP | H08112230 | 5/1996 |
| KR | 19990048173 | 7/1999 |
| WO | WO 2018/001496 | 1/2018 |

OTHER PUBLICATIONS

Office Action in Australian Appln. No. 2020224973, dated Sep. 26, 2022, 8 pages.

Extended European Search Report in European Appln. No. 20758469.9, dated Oct. 20, 2022, 10 pages.

DISHWASHER

CROSS-REFERENCE TO RELATED APPLICATIONS

This application is a National Stage Application under 35 U.S.C. § 371 of PCT/KR2020/000985, filed on Jan. 21, 2020, which claims priority to Korean Patent Application No. 10-2019-0018561, filed on Feb. 18, 2019. The disclosures of the prior applications are incorporated by reference in their entirety.

TECHNICAL FIELD

The present disclosure relates to a dishwasher, and more particularly, to a dishwasher in which a cover panel is mounted in front of a door.

BACKGROUND ART

A dishwasher is a home appliance that washes contaminants such as food residues on dishes, cooking utensils, etc. (hereinafter, 'washing target') by high-pressure washing water sprayed from a spray arm.

The dishwasher may wash a washing target in an inner space of a tub. The front surface of the tub may be opened, and covered by opening and closing of the door, and a cover panel forming an external shape may be mounted on the front surface of the door.

The cover panel may be formed of various materials, and a user may select one cover panel and mount the selected cover panel on the door, in consideration of an interior unification with surrounding furniture. The range of load may vary depending on the material of the cover panel. When selecting a material having a high density, there may be a problem in that it is difficult to maintain the open state of door due to the effect of the load acting on the mounted door.

In addition, in the case of a cover panel having a large load, the load of the cover panel is concentrated in a portion where the cover panel is mounted on the door. Accordingly, there may be a problem that the door is damaged in a portion where the cover panel is mounted on the door. Furthermore, when the cover panel is movably mounted on the door, the load acting on the door is increased when the cover panel is moved, so that the possibility that the door is structurally deformed or damaged at a portion where the cover panel is mounted on the door may increase.

European Registered Patent EP2407723B1 discloses a guide structure for guiding the movement of the cover panel at a portion where the panel is mounted. However, since the above mentioned description does not disclose a structure for supporting a large load of the cover panel by the door on which the cover panel is mounted, the above problem still exists.

DISCLOSURE

Technical Problem

An object of the present disclosure is to provide a dishwasher that minimizes a load applied to a door by a cover panel. That is, an object of the present disclosure is to provide a dishwasher having a structure capable of distributing the load of the cover panel acting on the door or supporting the load of the cover panel.

When the cover panel is movably mounted on the door, friction may occur between the cover panel and the door, which may cause damage to the cover panel or the door, or generate noise due to friction. Another object to the present disclosure is to reduce friction generated between the cover panel and the door.

The problems of the present disclosure are not limited to the problems mentioned above, and other problems not mentioned will be clearly understood by those skilled in the art from the following description.

Technical Solution

In order to achieve the above object, a dishwasher according to the present disclosure includes a cover panel mounted in the front of a door, wherein the cover panel has a structure that can move in the length direction of the door when the door is rotated by a link module. Here, an upper holder and a lower holder are disposed in one side of the cover panel, and the door includes an upper guider and a lower guider, which have the upper holder and the lower holder, that guide the movement of the cover panel in a length direction of the door. In addition, a door bracket which is fixed to the door and rotatably connected to the tub is fastened to the door at the rear of the lower guider, thereby preventing the load of the cover panel from being concentrated on the door through the door bracket.

The door includes: an inner door which is in contact with the opened one side of the tub, and opens and closes the tub; a first outer door which is fastened to the inner door at a front of the inner door, and in which the lower guider is disposed; and a second outer door which is disposed in an upper side of the first outer door, fastened to the inner door, and in which the upper guider is disposed, wherein the cover panel is mounted in each of the first outer door and the second outer door to be movable in a length direction of the door, so that the cover panel may be mounted in the first outer door and the second outer door.

The door bracket is fastened to each of the first outer door and the inner door between the first outer door and the inner door, so that the door bracket rotatably connected to the tub may distribute a load applied to the door.

The door bracket includes: a first door bracket which is rotatably coupled to the tub; and a second door bracket which is fastened to the first outer door at a rear of the lower guider, and has one side fastened to the first door bracket, so that the load applied by the door can be distributed.

The first door bracket includes: a tub connection portion rotatably connected to the tub at a lower end of the tub; a door fastening portion which extends from the tub connection portion to an upper side of the length direction of the door, and is fastened to the inner door; and a link connection portion which is disposed in a rear side of width direction of the door from the tub connection portion, and to which the link module for moving the cover panel is connected.

The dishwasher further includes a door fixing portion which maintains a disposition of the door opened from the tub, by applying a force to the door in a direction opposite to a load acting on the door, when the door is opened, wherein the first door bracket further includes a door fixing portion-connection portion which extends from the tub connection portion to a rear side of thickness direction of the door, and is connected to the door fixing portion, so that the load applied by the door can be distributed to the door fixing portion.

The door fixing portion includes: an elastic member for applying an elastic force to a rear of the door; a connection member connecting the elastic member and one side of the door; and a connection clip which is disposed in a distal end of the connection member, and fastened to the door fixing portion-connection portion.

A guide hole is formed in the lower guider in the length direction of the door, wherein a bracket hole is formed in the second door bracket in the length direction of the door at a position corresponding to the guide hole, wherein the lower holder is mounted in the lower guider in which the guide hole is formed and mounted in the second door bracket in which the bracket hole is formed. Accordingly, since the lower holder is mounted in the lower guider through the second door bracket, the load of the cover panel can be distributed to the tub through the door and the door bracket.

A lower holder insertion hole having a wider width in a width direction of the door than the guide hole is formed in an upper side of the guide hole, in the first outer door, so that the lower holder is inserted, wherein an insertion hole having a size corresponding to the lower holder insertion hole is formed in an upper side of the bracket hole, in the second door bracket, wherein the second door bracket includes a blocking protrusion protruding from a lower end of the insertion hole in a direction of the first outer door so as to cover a gap formed between the first outer door and the second door bracket, so that incorrect mounting of the lower holder can be prevented.

The upper guider includes: an upper guide groove formed in the length direction of the door so that the upper holder is inserted; and a guide rib which protrudes from one side of the upper guide groove and guides movement of the upper holder, thereby having a structure that can guide the upper holder.

A plurality of first rigidity reinforcing structures formed in a width direction of the door to reinforce rigidity of the guide rib are formed in the guide rib, wherein the plurality of first rigidity reinforcing structures are disposed spaced apart from each other at a certain interval in the length direction of the door, thereby withstanding the load of the cover panel applied to the upper guider from the upper holder.

The second outer door includes a plurality of second rigidity reinforcing structures disposed in one side of the guide rib and formed in a width direction of the door, wherein the plurality of second rigidity reinforcing structures are disposed spaced apart from each other at a certain interval in the length direction of the door, so that the rigidity of the upper guider may be reinforced.

Each of the upper holder and the lower holder is mounted in the door, and separates the door and the cover panel by a certain gap, so that the cover panel can move in the length direction of the door without contacting the door.

Each of the upper holder and the lower holder includes: a front body forming a surface in contact with the cover panel; a rear body which is disposed by a certain interval from the front body in a direction of the inner door; and a connection body which has a narrower width than the front body and the rear body, and connects the front body and the rear body, wherein the connection body has a shape inclined in a center direction from an upper end portion and a lower end portion, so that the upper holder and the lower holder can be easily mounted in the upper guider or the lower guider.

The details of other embodiments are included in the detailed description and drawings.

Advantageous Effects

According to the dishwasher of the present disclosure, there are one or more of the following effects.

First, there is an advantage that the door bracket which is fixed to the door and rotatably connected to the tub is fastened to the door at the rear of the lower guider, thereby preventing the load of the cover panel from being concentrated on the door through the door bracket, and stably supporting the cover panel.

Specifically, there is an advantage that the first outer door to which the lower holder is mounted is connected to the door bracket connected to the tub, thereby distributing the load acting on the door, and stably supporting the cover panel. In addition, there is an advantage that in the second outer door to which the upper holder is mounted, a rigid reinforcing structure is formed in the guide rib, thereby preventing structural deformation of the door in which the cover panel is mounted.

Second, there is also an advantage that the cover panel is mounted in the door through the lower holder and the upper holder, and the upper holder and the lower holder are spaced apart between the door and the cover panel by a certain distance to minimize a friction with the door generated according to the movement of the cover panel, thereby extending the use period of door and cover panel.

Effects of the present disclosure are not limited to the effects mentioned above, and other effects not mentioned will be clearly understood by those skilled in the art from the description of the claims.

MODE FOR INVENTION

Figure 1A:
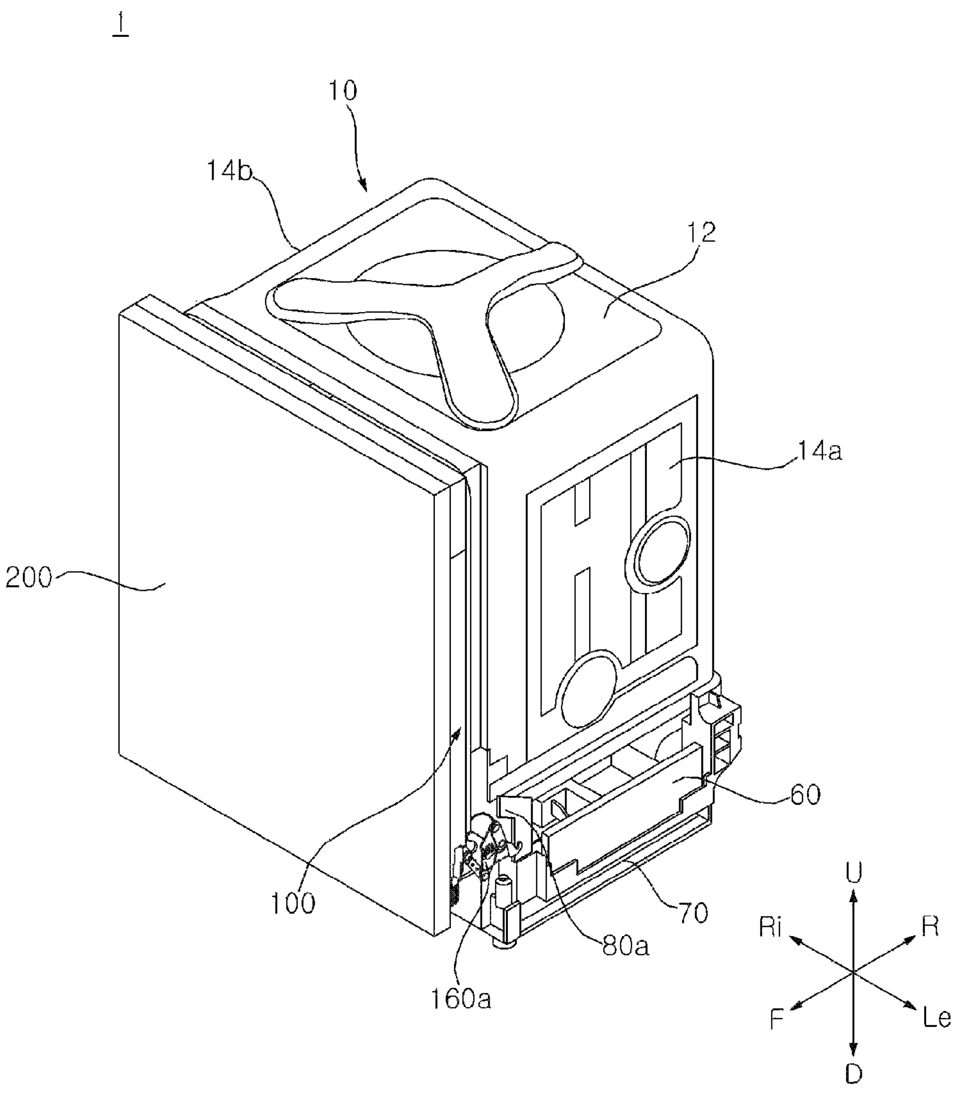
FIG. 1A is a perspective view of a dishwasher according to an embodiment of the present disclosure.

Advantages and features of the present disclosure and methods of achieving them will become apparent with reference to the embodiments described below in detail in conjunction with the accompanying drawings. However, the present disclosure is not limited to the embodiments disclosed below, but may be implemented in various different forms, and these embodiments are provided only to allow the disclosure of the present disclosure to be complete, and to completely inform those of ordinary skill in the art to which the present disclosure belongs, the scope of the invention, and the present disclosure is only defined by the scope of the claims. Like reference numerals refer to like elements throughout.

An expression indicating a direction such as up (U), down (D), left (Le), right (Ri), front (F), rear (R) used in FIGS. 1A to 5, FIGS. 7A to 9 is defined as shown in the drawing, but this is just an explanation for the present disclosure to be clearly understood, and it is obvious that each direction may be defined differently depending on where the reference is placed.

Referring to FIGS. 6A to 6B, FIGS. 10A to 16, a door 100, a door bracket 160*a*, 160*b*, and a cover panel 200, the disposition of which is changed according to the rotation of the door 100, may be explained based on the door length direction Lu-Ld, the door thickness direction Tf-Tr, and the door width direction Le-Ri. In the case of the door length direction, the vertical direction may be classified as a vertical direction of the door length direction based on when the door 100 closes the tub 10. In addition, in the case of the door thickness direction, the front-rear direction may be classified as a front-rear direction of the door thickness direction based on when the door 100 closes a tub 10. Since the door width direction Le-Ri is constant regardless of the disposition change of the door 10, it is the same as the left-right direction Le-Ri of a dishwasher 1.

Such a direction setting may be applied regardless of the disposition of the door 100. Therefore, it can be applied regardless of the disposition of the door 100 rotatably mounted in one side of the tub 10. This is for describing the door 100 and the door bracket 160*a*, 160*b*, and does not limit the scope of the invention.

Hereinafter, the present disclosure will be described with reference to the drawings for explaining the dishwasher according to embodiments of the present disclosure.

<Overall Configuration>

Hereinafter, the overall configuration of the dishwasher 1 according to the present embodiment will be briefly described with reference to FIGS. 1A to 4.

Figure 1B:
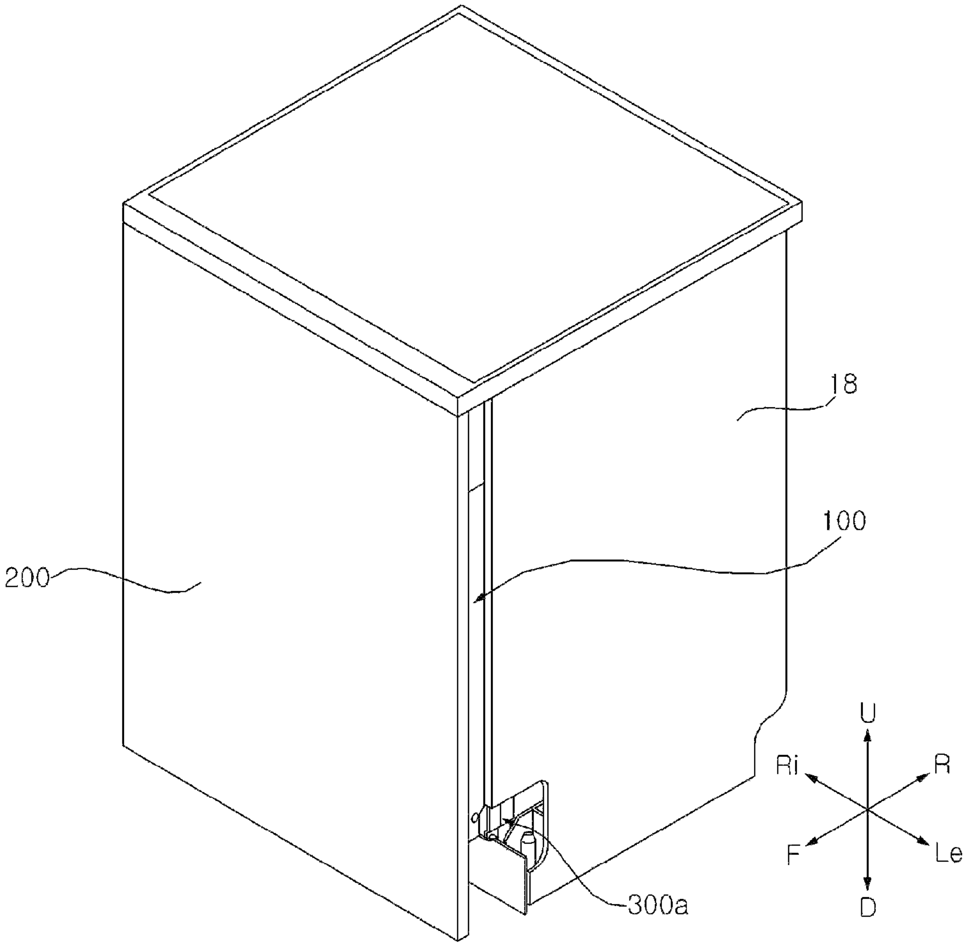
FIG. 1B is a perspective view of a dishwasher according to another embodiment of the present disclosure.
Figure 2:
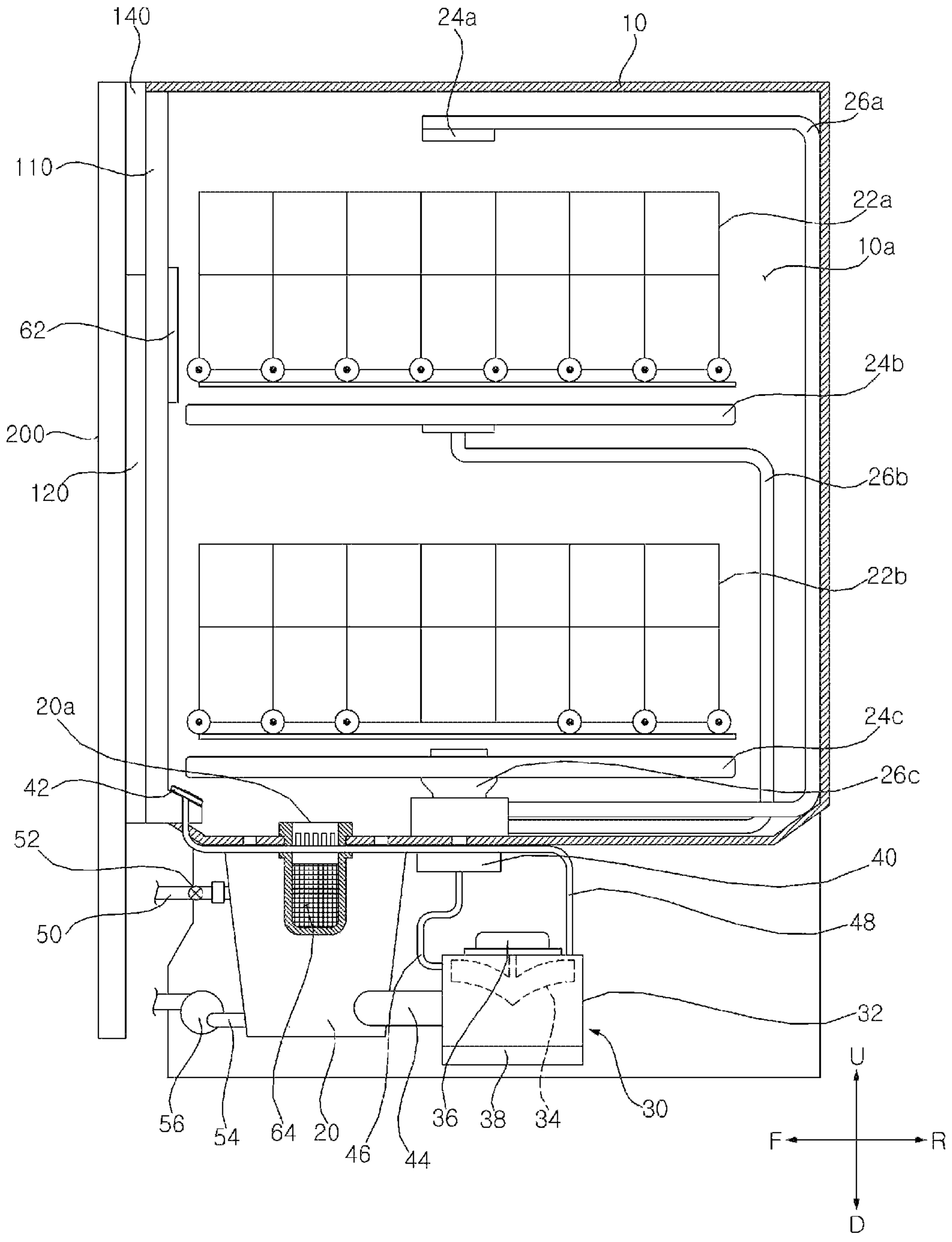
FIG. 2 is a schematic cross-sectional view of a dishwasher according to an embodiment of the present disclosure.

Referring to FIG. 1A, the dishwasher 1 according to the present embodiment may be used as a built-in in a space such as a kitchen. Accordingly, the dishwasher 1 according to the present embodiment may not include a separate case that covers the outside of the tub 10. However, in some embodiments, as shown in FIG. 1B, a case 18 forming an outer shape can be provided. Hereinafter, description will be made based on the dishwasher according to FIG. 1A, but the relationship between the link module 300*a*, 300*b*, the door 100, and the cover panel 200 described below may also be applied to a dishwasher having the case 18 of FIG. 1B.

The dishwasher 1 according to the present embodiment includes a tub 10 which forms a washing chamber 10*a* therein, and has an open front surface, a base 70 which is disposed in the lower side of the tub 10 and separates the tub 10 from the floor by a certain gap, a sump 20 which is disposed in the lower side of the tub 10 and temporarily stores washing water supplied to the tub 10, a door 100 which is rotatably connected to the tub 10 at the lower end of the tub 10, and opens and closes the open front surface of the tub 10, a cover panel 200 which covers the door 100 and the base 70, and is movably disposed in the door 100, and a link module 300*a*, 300*b* which moves the cover panel 200 in the length direction of the door, when the door 100 rotates.

The dishwasher 1 according to this embodiment may further include a rack 22*a*, 22*b* which is disposed inside the washing chamber 10*a*, and mounts washing target dishes, a plurality of spray nozzles 24*a*, 24*b*, 24*c* which sprays the washing water to the washing chamber 10*a*, a washing pump 30 which is disposed in the lower side of the tub 10, and pumps the washing water stored in the sump 20 to the plurality of spray nozzles 24*a*, 24*b*, 24*c*, a switching valve 40 which sends the washing water pumped from the washing pump 30 to at least one of the plurality of spray nozzles 24*a*, 24*b*, 24*c*, and a plurality of connection pipes 26*a*, 26*b*, 26*c* which connects the switching valve 40 and the plurality of spray nozzles 24*a*, 24*b*, 24*c*, respectively.

The washing pump 30 may rotate an impeller 34 disposed inside the washing pump housing 32 by using a washing motor 36 and supply washing water stored in the sump 20 to the tub 10. The washing pump 30 may further include a heater 38 for heating the washing water existing inside the washing pump housing 32. The heater 38 may generate steam by heating the washing water existing inside the washing pump 30.

The dishwasher 1 according to the present embodiment may further include a steam nozzle 42 for sending the steam generated by the heater 38 into the tub 10. The dishwasher 1 according to the present embodiment may include a washing pump inlet pipe 44 connecting the sump 20 and the washing pump 30, a washing pump discharge pipe 46 connecting the washing pump 30 and the switching valve 40, and a steam discharge pipe 48 connecting the washing pump 30 and the steam nozzle 42.

A filter 64 for filtering out foreign substances from the washing water flowing in from the tub 10 may be disposed in the sump 20. The dishwasher 1 according to the present embodiment may include a water supply pipe 50 for supplying washing water to the sump 20, a water supply valve 52 for opening and closing the water supply pipe 50, and a drain pipe 54 and a drain pump 56 for discharging the washing water of the sump 20 to the outside.

The tub 10 may have a box shape with an open front surface. The tub 10 may be connected to the sump 20 downwardly. The tub 10 may have a sump hole 20*a* connected to the sump 20 downwardly. A plurality of racks 22*a* and 22*b* may be disposed in the washing chamber 10*a* formed inside the tub 10.

A plurality of spray nozzles 24*a*, 24*b*, and 24*c* are disposed in the washing chamber 10*a* formed inside the tub 10. The plurality of spray nozzles 24*a*, 24*b*, 24*c* may spray the washing water toward the inner surface of the rack 22*a*, 22*b* or the tub 10.

A tub frame 16 may be disposed in the front side of the tub 10 so as to reinforce the strength of the tub 10. The tub frame 16 may be fastened to the tub 10, at the upper surface 12 of the tub 10 and at both side surfaces 14*a* and 14*b*.

The tub 10 is rotatably connected to the door 100 at the front lower end. The tub 10 may be hinge-connected to the door 100. That is, the door 100 may rotate based on the door rotating shaft 100*a* disposed at the front lower end of the tub 10.

The base 70 is disposed in the lower side of the tub 10, and supports the tub 10. The base 70 is a support means for separating the tub 10 from the floor by a certain gap, and may form a space in which the sump 20 and the washing pump 30 are disposed therein. A control box 60 accommodating a printed circuit board (not shown) for controlling the operation of the washing pump 30 and the like may be disposed in the inner side the base 70.

The front end 72 of the base 70 is separated from the front end 15 of the tub 10 to be disposed in the rear side of the front end 15 of the tub 10. The base 70 is disposed in the rear side of the tub 10 so as not to interfere with the movement of the cover panel 200 when the cover panel 200 moves due to the rotation of the door 100.

The front end 72 of the base 70 may have a shape that is inclined rearward as it progresses from the lower side to the upper side in consideration of the movement of the cover panel 200.

The tub 10 may be fastened to the base 70 and fixed to the upper side of the base 70. The tub 10 may be fastened to the base 70 by a separate fastening means (not shown). In addition, the tub 10 may be coupled to the base 70 through tub bracket 80*a*, 80*b* described below. The tub 10 and the base 70 according to the present embodiment may be fastened by a fastening means at the rear side, and by the tub bracket 80*a*, 80*b* at the front side.

<Tub Bracket>

Figure 3:
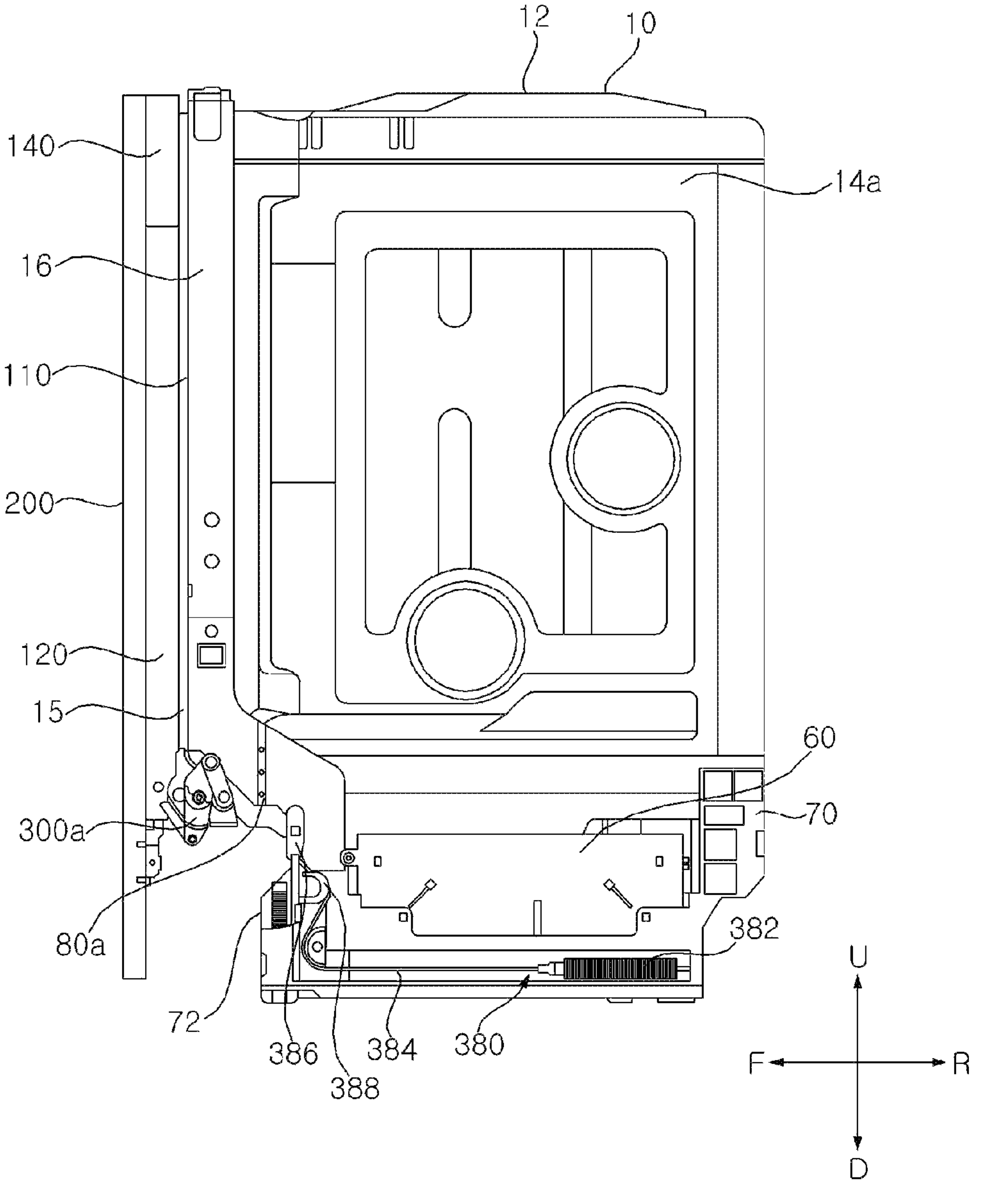
FIG. 3 is a side view of a dishwasher according to an embodiment of the present disclosure.
Figure 4:
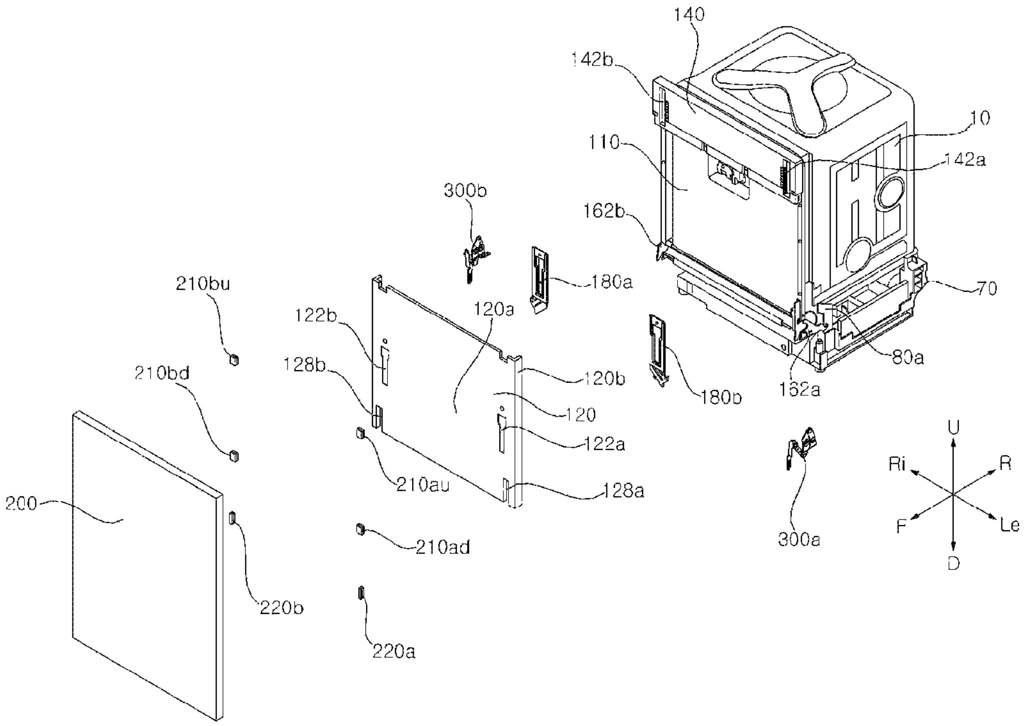
FIG. 4 is an exploded view of a door-related configuration of a dishwasher according to an embodiment of the present disclosure.
Figure 5:
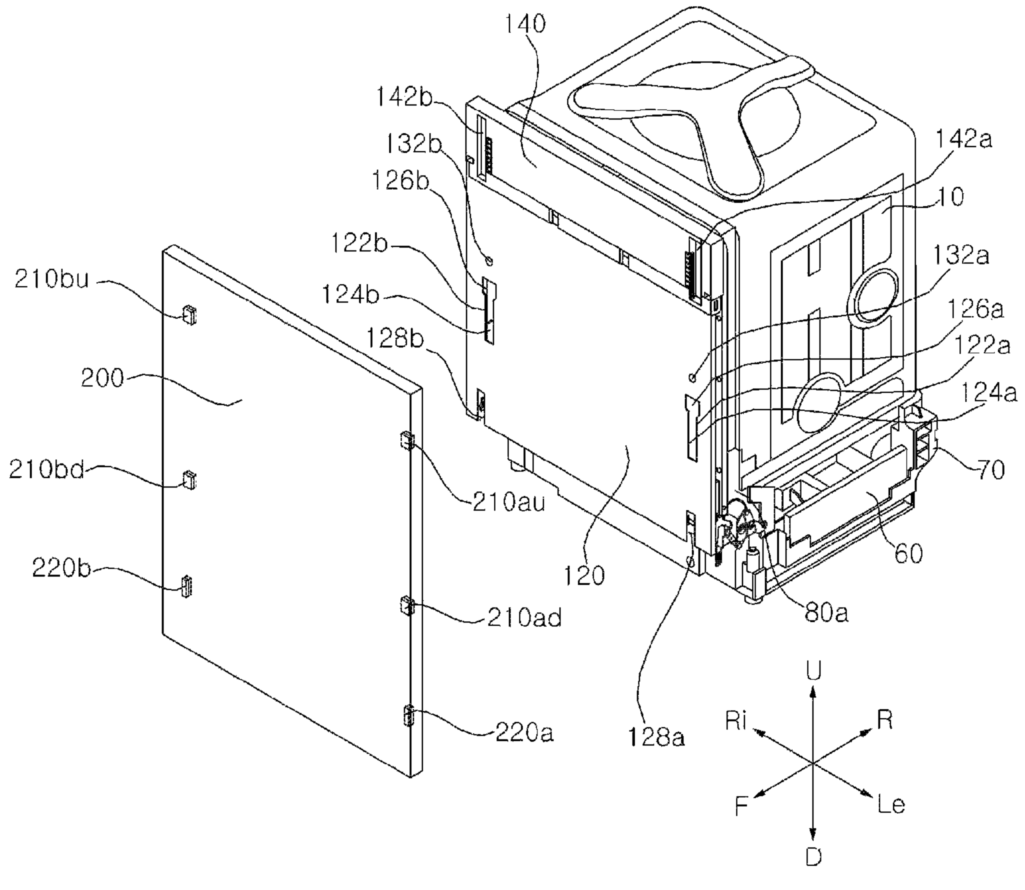
FIG. 5 is an exploded perspective view of a dishwasher and a cover panel according to an embodiment of the present disclosure.
Figure 6A:
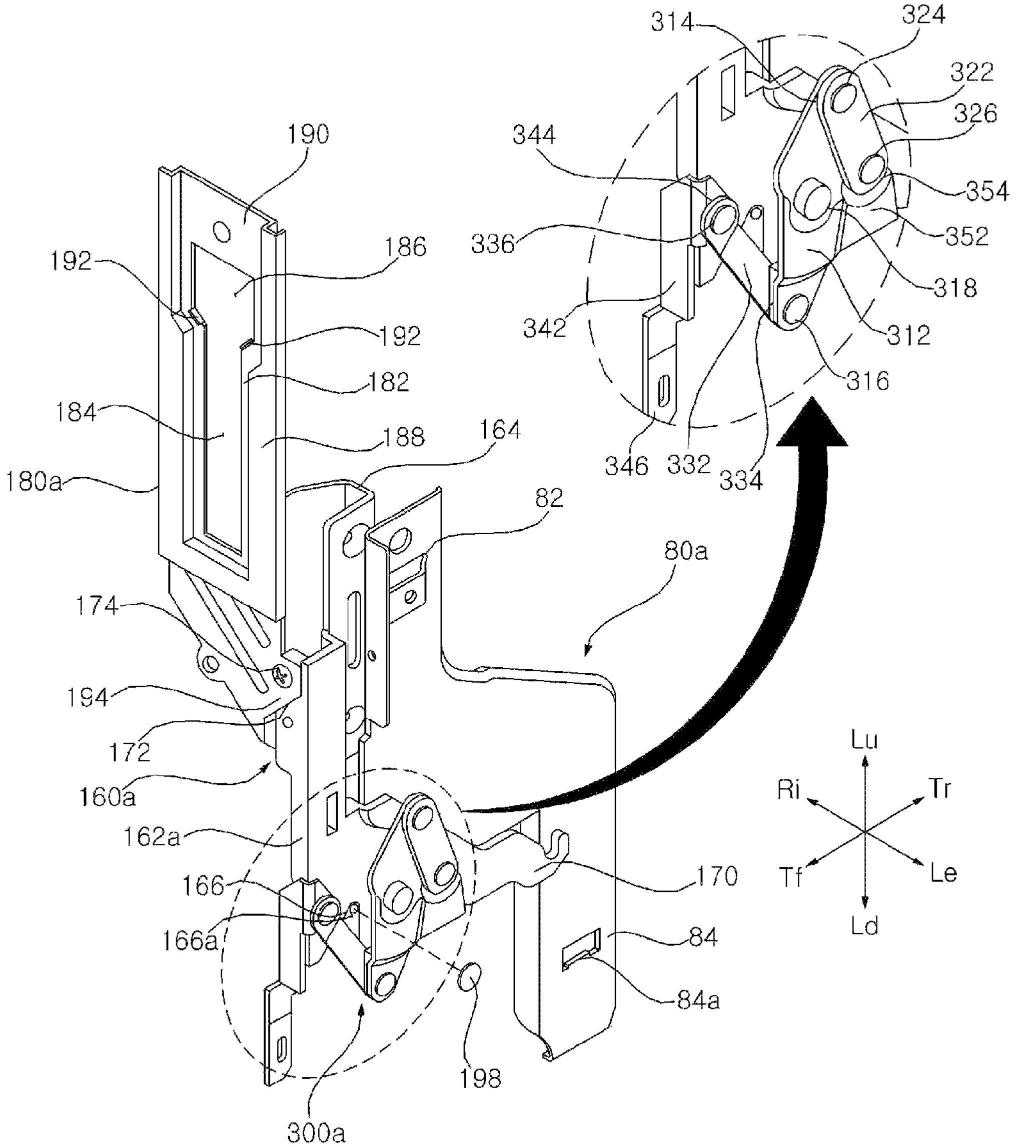
FIG. 6A is a perspective view of a tub bracket, a door bracket, and a link module according to an embodiment of the present disclosure.
Figure 6B:
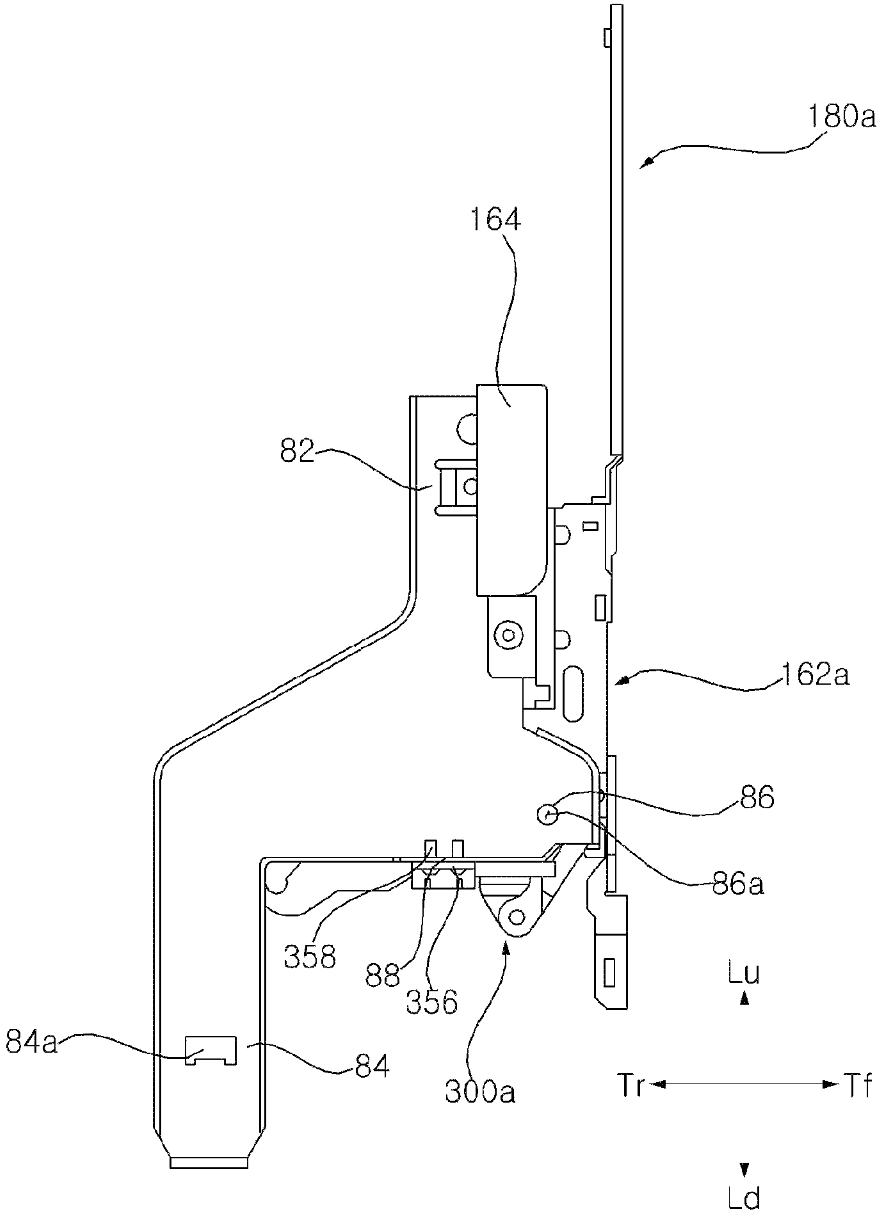
FIG. 6B is one side view of a tub bracket, a door bracket, and a link module according to an embodiment of the present disclosure.

Hereinafter, a tub bracket according to the present embodiment will be described with reference to FIGS. 3, 5, to 6B.

The dishwasher 1 according to the present embodiment may further include tub bracket 80*a*, 80*b* which is fixedly disposed in a lower portion of the tub 10 and rotatably connected to the door 100. The tub bracket 80*a*, 80*b* may fasten the tub 10 and the base 70. The tub bracket 80*a*, 80*b* may fix the tub 10 to the upper side of the base 70, and dispose the door 100 to be rotatable to the front of the tub 10. The door 100 according to the present embodiment may be rotatably disposed in the tub bracket 80*a*, 80*b* fastened to the tub 10. Specifically, the door bracket 160*a*, 160*b* fixed to the door 100 are rotatably disposed in the tub bracket 80*a*, 80*b* according to the present embodiment.

A pair of tub brackets 80*a*, 80*b* are disposed in both sides of the tub 10 respectively. The tub bracket 80*a*, 80*b* includes a first tub bracket 80*a* disposed in the left side of the tub 10 and a second tub bracket 80*b* disposed in the right side of the tub 10. The first tub bracket 80*a* and the second tub bracket 80*b* have a symmetrical structure and are disposed in the opposite side of the tub 10. Each of the first tub bracket 80*a* and the second tub bracket 80*b* may be fastened to the front side of the tub 10 and the front side of the base.

Hereinafter, a detailed configuration and shape of the tub bracket 80*a*, 80*b* will be described with reference to FIGS. 6A and 6B. In FIGS. 6A to 6B, the first tub bracket 80*a* will be described as a reference, but the above configuration and shape may be identically applied to the second tub bracket 80*b*.

The tub bracket 80*a*, 80*b* may be respectively fastened to the tub 10 and the base 70. The tub bracket 80*a*, 80*b* may include a tub fastening portion 82 fastened to the tub 10, a base fastening portion 84 fastened to the base 70, and a door connection portion 86 rotatably connected to the door bracket 160*a*, 160*b*.

The tub fastening portion 82 is fastened to one side of the tub 10. The tub fastening portion 82 is disposed at the front end of one side of the tub 10. The tub fastening portion 82 may be fastened to the tub 10 by a separate fastening means (not shown) such as a bolt.

A hinge hole 86*a* formed to be connected to the door bracket 160*a*, 160*b* is formed in the door connection portion 86. The door connection portion 86 may be connected to the door bracket 160*a*, 160*b* through a separate hinge member 198. The door connection portion 86 is disposed in the lower side of the tub fastening portion 82. The hinge hole 86*a* formed in the door connection portion 86 may be disposed in the front of the tub 10. Accordingly, the door rotating shaft 100*a* on which the door 100 rotates may be formed in the front of the tub 10.

The base fastening portion 84 may extend downward from the rear of the door connection portion 86. The base fastening portion 84 has a structure extending downward from a portion where the base 70 is disposed.

The base fastening portion 84 may be coupled to the base 70 in a hook manner. That is, a hook portion 84*a* coupled to the base 70 is formed in the base fastening portion 84 according to the present embodiment. The hook portion 84*a* of the base fastening portion 84 may be coupled to a corresponding structure of the base 70 in a hook manner.

The tub bracket 80*a*, 80*b* further include a link fastening portion 88 for fixing one side of the link module 300*a*, 300*b*. The link fastening portion 88 may form a surface bent perpendicular to a surface formed by the tub bracket 80*a*, 80*b*. A link bracket 350 of link module 300*a*, 300*b* described below is fastened and fixed to the link fastening portion 88. To the link fastening portion 88, a link bracket-fastening portion 356 of the link bracket 350 is fastened by a separate fastening member 358.

<Link and Movement of Door>

Hereinafter, a link module and an operation of the link module according to the present embodiment will be described with reference to FIGS. 6A to 7C.

The link module 300*a*, 300*b* moves the cover panel 200 disposed in front of the door 100 in the length direction (Lu-Ld) of the door, when the door 100 rotates. The link module 300*a*, 300*b* linearly moves the cover panel 200 by using a rotating force of the door 100.

A pair of link modules 300*a*, 300*b* according to the present embodiment may be provided in both sides of the door, respectively. The link module 300*a*, 300*b* according to the present embodiment include a first link module 300*a* disposed in the right side of the door 100 and a second link module 300*b* disposed in the left side of the door 100. The first link module 300*a* and the second link module 300*b* are disposed in the left and right sides of the door in a form having the same configuration and function.

Hereinafter, a detailed configuration of the first link module 300*a* will be described with reference to FIGS. 6A to 6B. The first link module 300*a* described herein may be identically applied to the second link module 300*b*.

The link module 300*a*, 300*b* according to the present embodiment may include a first link 310 rotatably connected to the door bracket 160*a*, 160*b*, a second link 320 rotatably connected to the tub bracket 80*a*, 80*b* and the first link 310, and a third link 330 rotatably connected to the first link 310 and the cover panel 200. The link module 300*a*, 300*b* according to the present embodiment may further include a link bracket 350 connecting the second link 320 and the tub bracket 80*a*, 80*b*, and a link holder 340 connecting the third link 330 and the cover panel 200.

The first link 310 includes a first link body 312, a first link-first connection portion 314 which is disposed in one end of the first link body 312, and rotatably connected to the second link 320, a first link-second connection portion 316 which is disposed in the other end of the first link body 312, and rotatably connected to the third link 330, and a first link-bracket connection portion 318 which is disposed between the first link-first connection portion 314 and the first link-second connection portion 316, and is rotatably connected to the door bracket 160*a*, 160*b*.

The second link 320 includes a second link body 322, a second link-first connection portion 324 which is disposed in one end of the second link body 322 and rotatably connected to the first link 310, and a second link-second connection portion 326 which is disposed in the other end of the second link body 322 and rotatably connected to the tub bracket 80*a*, 80*b*. The second link-second connection portion 326 may be rotatably connected to the tub bracket 80*a*, 80*b* through the link bracket 350. That is, the second link-second connection portion 326 is rotatably connected to the link bracket-connection portion 354 of the link bracket 350 fastened to the tub bracket 80*a*, 80*b*.

The third link 330 includes a third link body 332, a third link-first connection portion 334 which is disposed in one end of the third link body 332 and rotatably connected to the first link 310, and a third link-second connection portion 336 which is disposed in the other end of the third link body 332 and rotatably connected to the cover panel 200. The third link-second connection portion 336 is rotatably connected to the cover panel 200 through the link holder 340. That is, the third link-second connection portion 336 is rotatably connected to a link holder-connection portion 344 of the link holder 340 fastened to the cover panel 200.

In the link bracket 350, one side is fixed to the tub bracket 80*a*, 80*b*, and the other side is rotatably connected to the second link 320. Accordingly, the position of the second link-second connection portion 326 of the second link 320 rotatably connected to the link bracket 350 is fixed.

The link bracket 350 includes a link bracket body 352, a link bracket-connection portion which is disposed in one end of the link bracket body 352 and rotatably connected to the second link 320, and a link bracket-fastening portion 356 which is disposed in the other end of the link bracket body 352 and fixed to the tub bracket 80*a*, 80*b*.

The link bracket-fastening portion 356 is fastened to one side of the tub bracket 80*a*, 80*b* so that the disposition is fixed. The link bracket-fastening portion 356 according to the present embodiment is fastened to the tub bracket 80*a*, 80*b* through a separate fastening member 358. The link bracket-fastening portion 356 is fixed to the tub bracket 80*a*, 80*b* to fix the disposition of the link bracket 350. Accordingly, even when the door 100 is rotated, the position of the link bracket-connection portion 354 rotatably connected to the second link 320 may be fixed.

The link holder 340 includes a link holder body 342, a link holder-connection portion 344 which is disposed in one end of the link holder body 342, and to which the third link 330 is rotatably connected, and a link holder-fastening portion 346 which is disposed in the other end of the link holder body 342 and is fastened to the cover panel 200. The link holder 340 is connected to the cover panel 200 through the cover panel fastening member 220 that is fastened to the cover panel 200. The link holder 340 is fastened to the cover panel fastening member 220 so that the disposition is fixed.

The link holder 340 may dispose a position in which the cover panel 200 and the link module 300*a*, 300*b* are fastened to the lower side of the tub 10. The link holder-fastening portion 346 of the link holder 340 may be disposed below the lower end of the first outer door 120. When the door 100 is closed, the link holder-fastening portion 346 of the link holder 340 is disposed below the lower end of the first outer door 120.

That is, the cover panel fastening member 220 mounted in the cover panel 200 and the link holder-fastening portion 346 of the link holder 340 can be fastened in a lower space of the tub 10, so that a user may assemble the cover panel 200 to the link module 300*a*, 300*b*. Since the link holder-fastening portion 346 is fixedly fastened to the cover panel fastening member 220, the disposition of the link holder 340 may be uniformly maintained in relation to the cover panel 200.

Figure 7A:
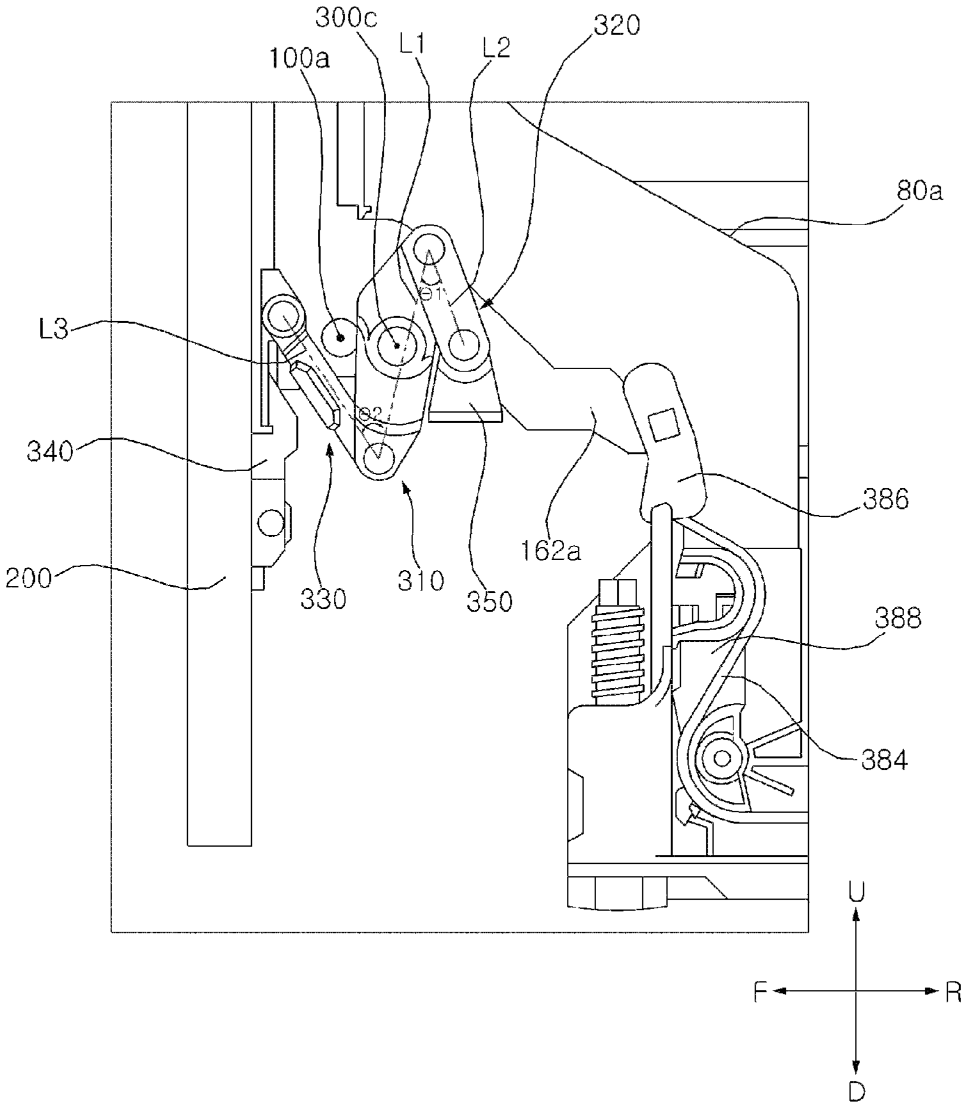
FIG. 7A is a view for explaining a disposition of a link module in a state in which a door is closed according to an embodiment of the present disclosure.
Figure 7B:
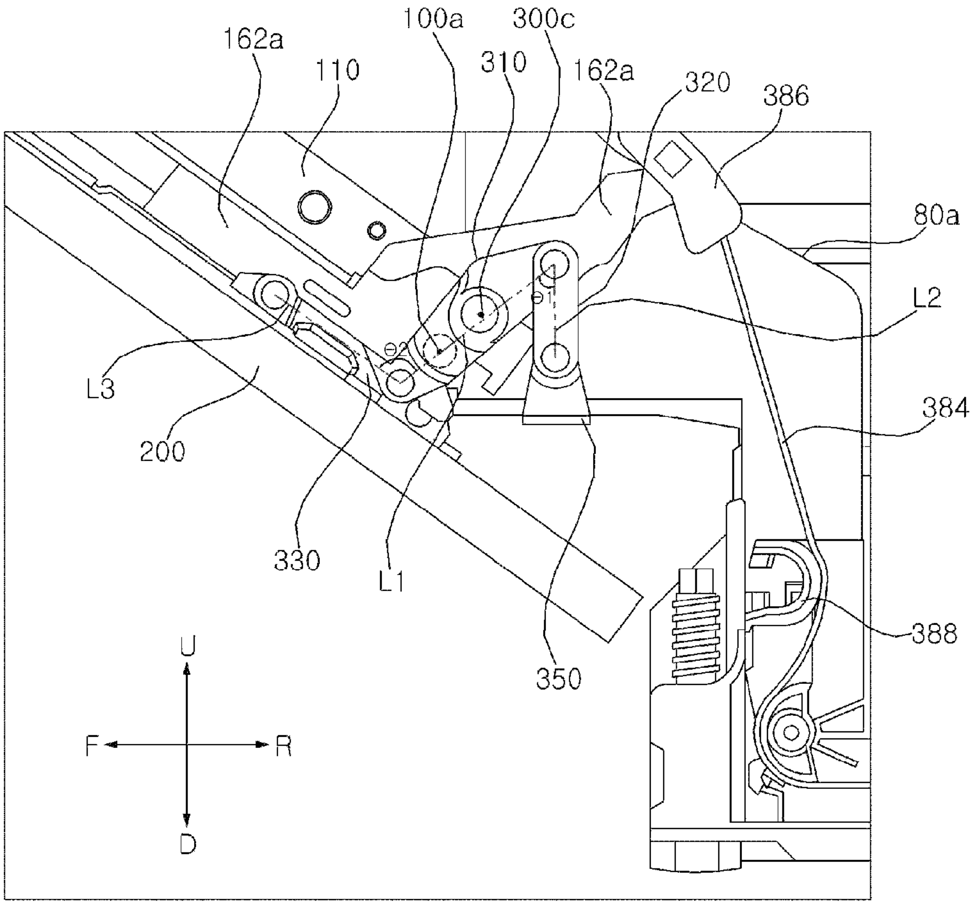
FIG. 7B is a view for explaining a disposition of a link module in a state in which a door is opened or closed according to an embodiment of the present disclosure.
Figure 7C:
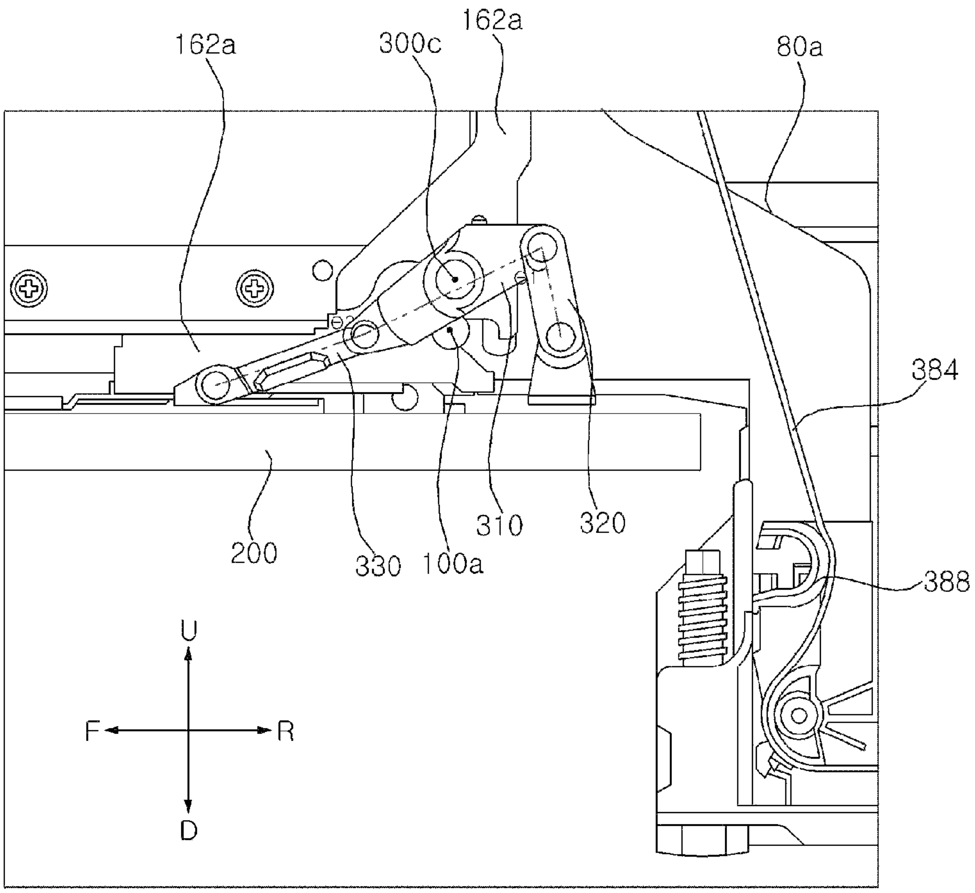
FIG. 7C is a view for explaining a disposition of a link module in a state in which a door is fully opened according to an embodiment of the present disclosure.
Figure 8:
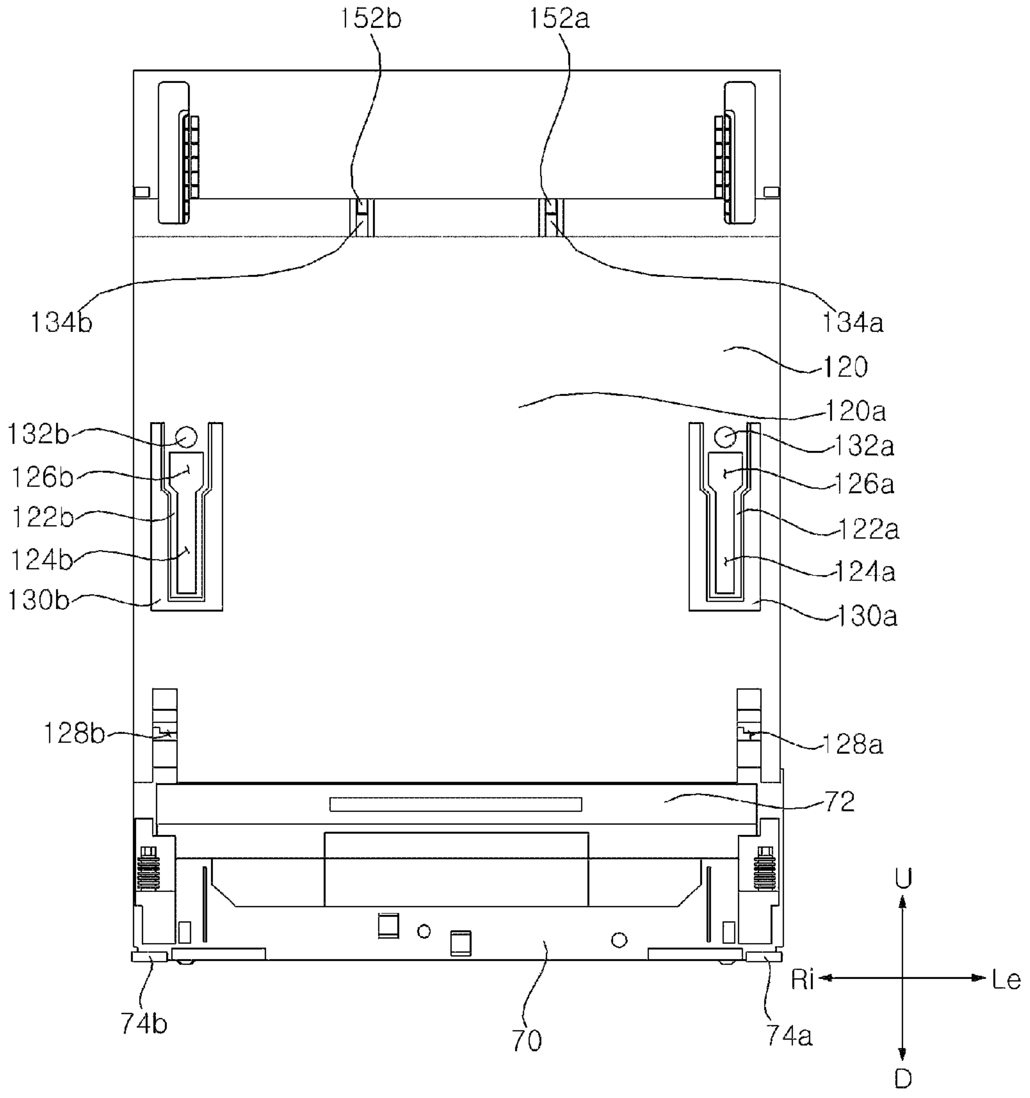
FIG. 8 is a front view of a dishwasher from which a cover panel is removed according to an embodiment of the present disclosure.
Figure 9:
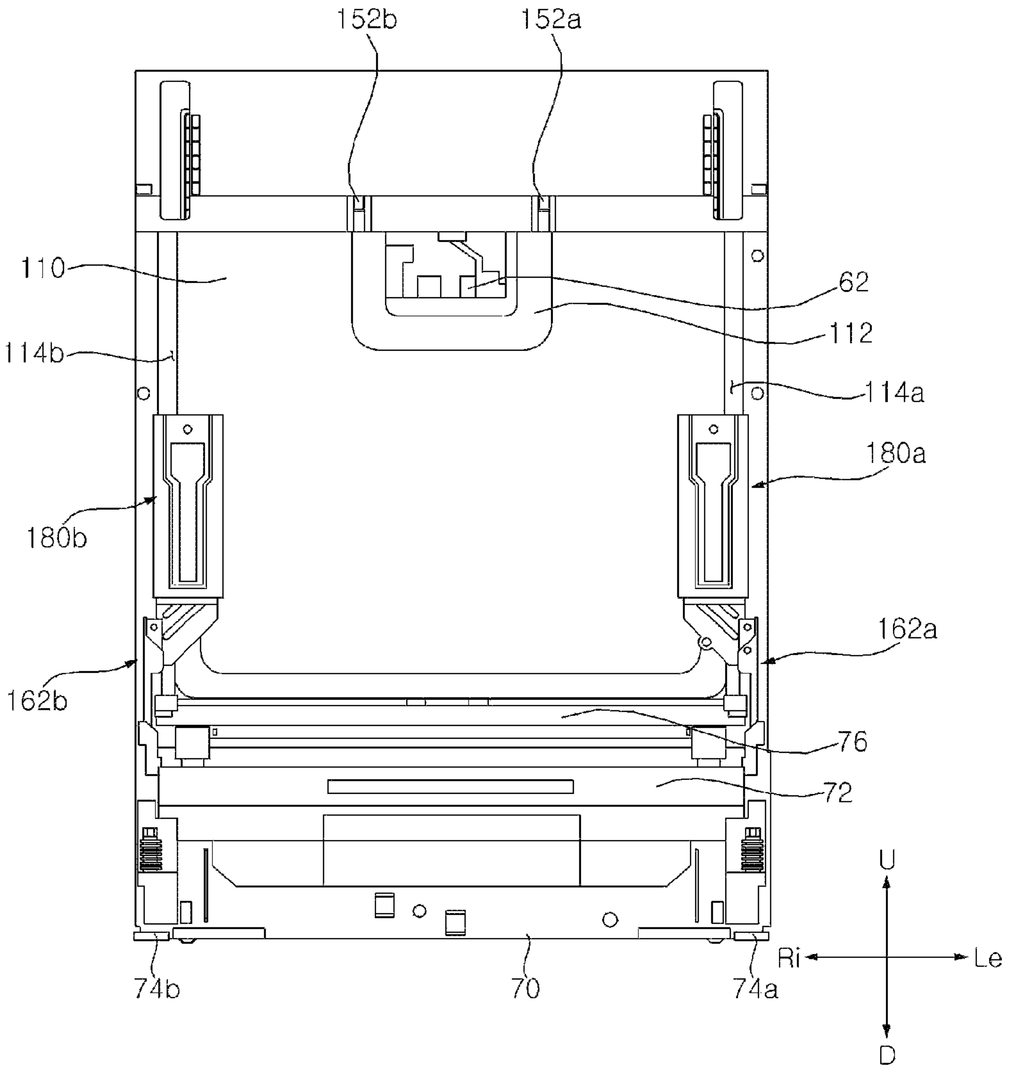
FIG. 9 is a front view of a state in which a first outer door is removed in FIG. 8.
Figure 10A:
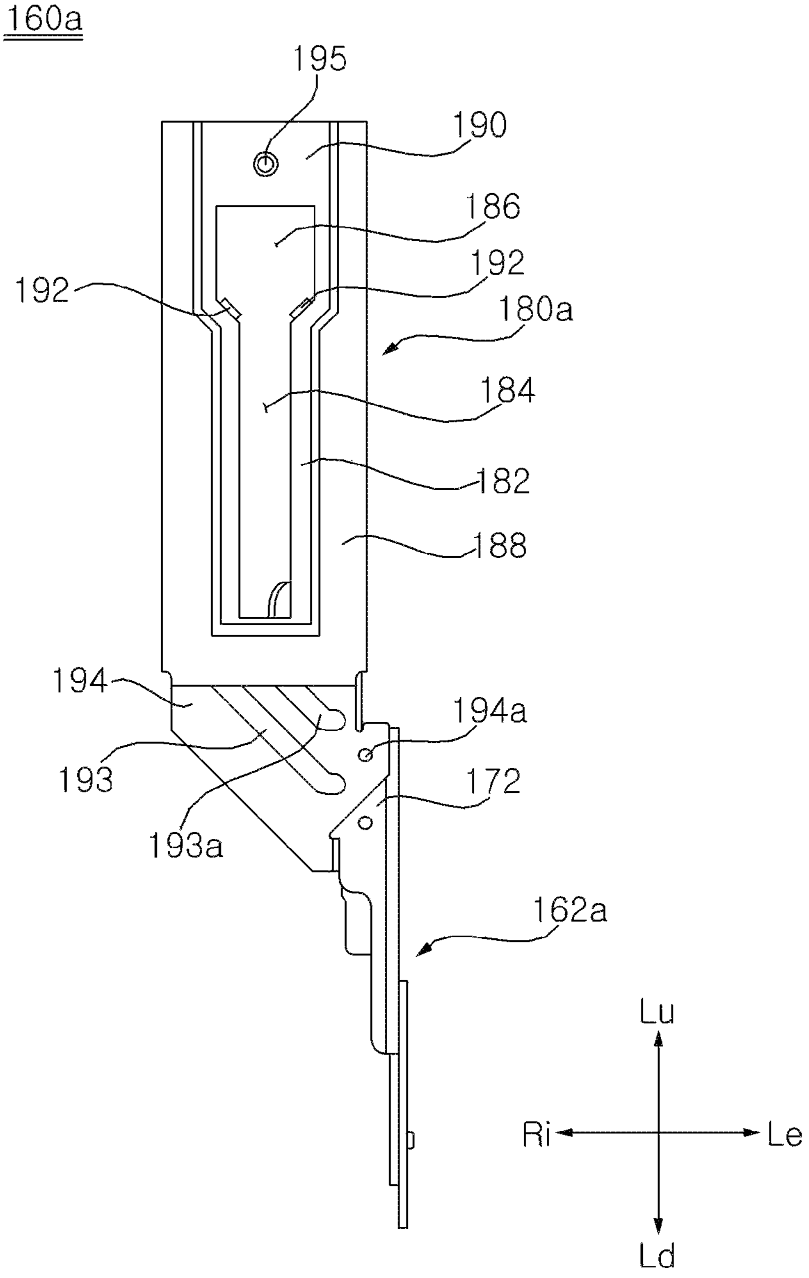
FIG. 10A is a front view of a door bracket according to an embodiment of the present disclosure.
Figure 10B:
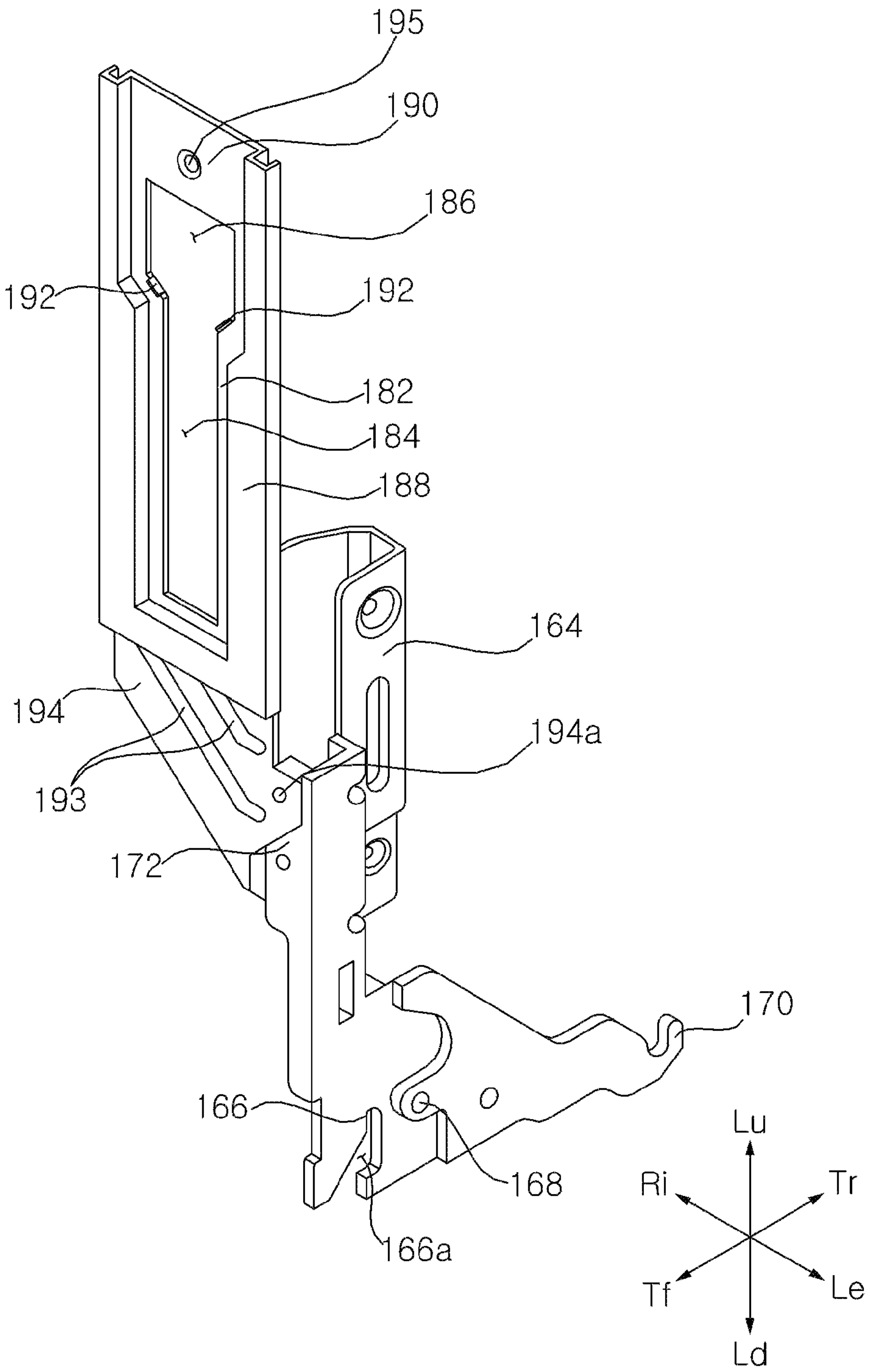
FIG. 10B is a perspective view of a door bracket according to an embodiment of the present disclosure.

Referring to FIGS. 7A to 7C, the disposition of the link module 300*a*, 300*b* is changed according to the rotation of the door 100, and the cover panel 200 movably disposed in the door 100 is moved.

When the door 100 is opened, as the door 100 rotates based on the door rotating shaft 100*a*, the link shaft 300*c* rotates counterclockwise. The link shaft 300*c* moves from the rear side (R) of the door rotating shaft 100*a* to the upper side (U) of the door rotating shaft 100*a*. Since the link shaft 300*c* moves when the door 100 is opened, the first link 310 pushes the third link 330 to the front side. Accordingly, the cover panel 200 may move to the upper side (Lu) of the length direction of the door by the third link 330 when the door 100 rotates.

On the other hand, when the door 100 is closed, the link shaft 300*c* rotates clockwise as the door 100 rotates based on the door rotating shaft 100*a*. The link shaft 300*c* moves from the upper side U of the door rotating shaft 300*c* to the rear side R of the door rotating shaft 100*a*. Since the link shaft 300*c* moves when the door 100 is closed, the first link 310 pulls the third link 330 to the rear side. Accordingly, the cover panel 200 may move to the lower side Td of the length direction of the door by the third link 330 when the door 100 rotates.

<Door and Door Bracket>

Hereinafter, a door and a door bracket mounted in the door according to the present embodiment will be described with reference to FIGS. 4 to 11.

The door 100 opens and closes the opened front surface of the tub 10. The door 100 according to the present embodiment includes an inner door 110 that contacts the front surface of the tub 10 and closes the opened portion of the tub 10, a first outer door 120 fastened to the inner door

110 at the front of the inner door 110, and a second outer door 140 which is disposed in the upper side of the first outer door 120 and is fastened to the inner door 110.

The inner door 110 may be located in the open front portion of the tub 10 to close the tub 10. In front of the inner door 110, the second outer door 140 and the first outer door 120 are mounted. The inner door 110 may have a substantially rectangular plate shape. A dispenser 62 in which detergent or the like supplied to the inside of the tub 10 is temporarily stored may be disposed in the inner door 110. The inner door 110 includes a dispenser mounting portion 112 in which the dispenser 62 is mounted. The dispenser 62 is disposed so as to be opened in the inner direction of the inner door 110.

In the inner door 110, a door bracket fastening groove 114*a*, 114*b* in which a portion of the first door bracket 162 described below is accommodated is formed. The door bracket fastening groove 114*a*, 114*b* is formed to extend in the vertical direction. The door bracket fastening groove 114*a*, 114*b* forms a concave groove in the rear direction from the front surface on which the first door bracket 162 is mounted. The first door bracket 162 may be inserted into the door bracket fastening groove 114*a*, 114*b* and fixed to the inner door 110 through a separate fastening member (not shown).

A pair of door bracket fastening grooves 114*a*, 114*b* in which a pair of first door brackets 162 are mounted are formed in the inner door 110. Each of the pair of door bracket fastening grooves 114*a*, 114*b* may be formed at both side ends of the front surface of the inner door 110.

The first outer door 120 and the second outer door 140 are fastened to the front surface of the inner door 110. The first outer door 120 and the second outer door 140 are disposed in the vertical direction on the front surface of the inner door 110.

The first outer door 120 is disposed in the front of the inner door 110. The first outer door 120 may be disposed in the lower side of the second outer door 140. The inner door 110 is disposed at the rear of the first outer door 120, and the cover panel 200 is disposed at the front of the first outer door 120.

The first outer door 120 includes a front plate 120*a* and an edge portion 120*b* formed by bending from a circumference of the front plate 120*a*. The front plate 120*a* has a rectangular plate shape, and a lower guider 122*a*, 122*b* and a fastening member moving groove 128*a*, 128*b*, which will be described below, are formed in the front plate 120*a*. The edge portion 120*b* is formed by being bent in the direction of the inner door 110 from both side circumferences of the front plate 120*a*, and may be fastened to the inner door 110 by a separate fastening means (not shown).

In the first outer door 120, the cover panel 200 is mounted to be movable in the length direction of the door 100. The first outer door 120 may have a structure in which a part of upper end is fastened to a lower portion of the second outer door 140. The first outer door 120 includes an upper fastening portion 134*a*, 134*b* which is disposed in the upper end of the first outer door 120 and connected to the lower end of the second outer door 140. The upper fastening portion 134*a*, 134*b* is fastened to the lower fastening portion 152*a*, 152*b* of the second outer door 140. The upper fastening portion 134*a*, 134*b* and the lower fastening portion 152*a*, 152*b* may be fastened to each other in a hook manner.

The first outer door 120 includes a lower guider 122*a*, 122*b* for guiding the movement of the cover panel 200. In the lower guider 122*a*, 122*b*, a guide hole 124*a*, 124*b* for guiding the movement of the lower holder 210*ad*, 210*bd* mounted on the cover panel 200 is formed, which will be described below. A second door bracket 180 may be disposed in a rear side of the first outer door 120 so as to reinforce the rigidity of the lower guider 122*a*, 122*b* formed in the first outer door 120.

A second door bracket 180 is disposed in one side of the first outer door 120. The second door bracket 180 is disposed in the rear surface of the first outer door 120. The bracket hole 184 formed in the second door bracket 180 has the same shape as the guide hole 124*a*, 124*b*. The bracket hole 184 formed in the second door bracket 180 is disposed in the rear side of the guide hole 124*a*, 124*b*.

A fastening groove 132*a*, 132*b* fastened to the second door bracket 180 and a separate fastening member (not shown) is formed in the first outer door 120. A groove 130*a*, 130*b* may be formed in the first outer door 120 at a portion where the second door bracket 180 is mounted. The groove 130*a*, 130*b* may reinforce the strength of the first outer door 120 around the guide hole 124*a*, 124*b*. The groove 130*a*, 130*b* is formed similarly to the shape of the second door bracket 180, so that the second door bracket 180 can be easily mounted in the first outer door 120. The groove 130*a*, 130*b* disposes a portion of the lower holder 210*ad*, 210*bd* disposed between the first outer door 120 and the cover panel 200 to the inner side the first outer door 120, so that a space between the outer door 120 and the cover panel 200 can be reduced.

The guide hole 124*a*, 124*b* is formed between the grooves 130*a* and 130*b* in the length direction (Lu-Ld) of the door.

In the first outer door 120, a lower holder insertion hole 126*a*, 126*b* into which the lower holder 210*ad*, 210*bd* is inserted may be formed in the upper side of the guide hole 124*a*, 124*b*. The lower holder insertion hole 126*a*, 126*b* is formed to be wider than the guide hole 124*a*, 124*b* in the width direction (Le-Ri) of the door so that the lower holder 210*ad*, 210*bd* can be inserted.

Similarly, an insertion hole 186 corresponding to the lower holder insertion hole 126*a*, 126*b* may be formed in the second door bracket 180 as well.

A fastening member moving groove 128*a*, 128*b* formed in the length direction (Lu-Ld) of the door through which the cover panel fastening member 220 moves is formed in the first outer door 120. The fastening member moving groove 128*a*, 128*b* has a guide structure through which the cover panel fastening member 220 moves. The fastening member moving groove 128*a*, 128*b* is formed from the lower end of the first outer door 120 toward the upper side Lu of the length direction of the door. The cover panel fastening member 220 moves along the fastening member moving groove 128*a*, 128*b*, and may move the cover panel 200 in the length direction (Lu-Ld) of the door.

The second outer door 140 is fastened to the front surface of the inner door 110. The second outer door 140 is disposed in the upper side of the first outer door 120. An operation button (not shown) formed to allow a user to operate the dishwasher 1 may be disposed on one side surface of the second outer door 140, and a printed circuit board (not shown) connected to the operation button may be disposed inside the second outer door 140.

In the second outer door 140, the cover panel 200 is movably mounted in the length direction (Lu-Ld) of the door. The second outer door 140 includes an upper guider 142*a*, 142*b* for guiding the movement of the cover panel 200 mounted on the front surface of the second outer door 140.

The upper guider 142*a*, 142*b* includes an upper guide groove 144*a*, 144*b* into which the upper holder 210*au*, 210*bu* mounted in the cover panel 200 described below is inserted, and a guide rib 146*a*, 146*b* that protrudes from one side of the upper guide groove 144*a*, 144*b* and guides the movement of the upper holder 210*au*, 210*bu*.

The upper guide groove 144*a*, 144*b* is formed in the length direction of the door in which the upper holder 210*au* and 210*bu* moves. In the upper side of the upper guide groove 144*a*, 144*b*, an upper holder insertion hole 154*a*, 154*b* formed to mount the upper holder 210*au*, 210*bu* to the upper guider 142*a*, 142*b* is formed.

The upper holder 210*au*, 210*bu* may move vertically in the length direction of the door along the guide rib 146*a*, 146*b* formed in the upper guide groove 144*a*, 144*b*. The guide rib 146*a*, 146*b* may protrude in a direction away from the center of the control panel 140.

A first rigidity reinforcing structure 148*a*, 148*b* for reinforcing the rigidity of the guide rib 146*a*, 146*b* may be formed in the guide rib 146*a*, 146*b*. Inside the guide rib 146*a*, 146*b*, a concave groove is formed and a plurality of first rigidity reinforcing structures 148*a* and 148*b* formed in the width direction (Le-Ri) of the door are formed. The first rigidity reinforcing structure 148*a*, 148*b* has a shape extending in the width direction (Le-Ri) of the door. The plurality of first rigidity reinforcing structures 148*a* and 148*b* may be spaced apart from each other by a certain interval in the length direction (Lu-Ld) of the door.

In addition, in the second outer door 140, a second rigidity reinforcing structure 150*a*, 150*b* for additionally reinforcing the rigidity of the guide rib 146*a*, 146*b* to one side of the upper guider 142*a*, 142*b* may be formed.

In the second rigidity reinforcing structure 150*a*, 150*b*, a plurality of ribs may be formed in the width direction (Le-Ri) of the door, in a groove structure formed in the length direction (Tu-Td) of the door. The second rigidity reinforcing structure 150*a*, 150*b* is disposed in one side of the first rigidity reinforcing structure 148*a*, 148*b*. The second rigidity reinforcing structure 150*a*, 150*b* is disposed in one side of the guide rib 146*a*, 146*b* to reinforce the rigidity of the guide rib 146*a*, 146*b*. Accordingly, it is possible to withstand the load of the cover panel 140 acting on the guide rib 146*a*, 146*b* through the upper holder 210*au*, 210*bu*.

In the second outer door 140, a rear hole 151*a*, 151*b* may be formed in a rear side of the guide rib 146*a*, 146*b*. The rear hole 151*a*, 151*b* may facilitate injection of the guide rib 146*a*, 146*b* disposed in the front side.

A plurality of rear rigidity reinforcing structures 155 and 156 extending from the guide rib 146*a*, 146*b* are disposed on the rear surface of the second outer door 140. The plurality of rear rigidity reinforcing structures ( ) include a first rear rigidity reinforcing structure 155 extending from one end of the guide rib 146*a*, 146*b* in the width direction (Le-Ri) of the door, and a second rear rigidity reinforcing structure 156 which extends from one end of the guide rib 146*a*, 146*b* and forms an inclination angle with the first rear rigidity reinforcing structure 155.

A pair of upper guiders 142*a*, 142*b* into which the upper holder 210*au*, 210*bu* is inserted are disposed in both sides of the front surface of the second outer door 140.

In a lower portion of the second outer door 140, a lower fastening portion 152*a*, 152*b* fastened to the first outer door 120 disposed in the lower side of the second outer door 140 may be disposed.

The dishwasher 1 according to the present embodiment further includes a door bracket 160*a*, 160*b* which is fixedly fastened to the door and rotatably connected to the tub 10.

The door bracket 160*a*, 160*b* is fixedly connected to the door 100, and rotatably connected to the tub bracket 80*a*, 80*b* fixedly connected to the tub 10. The door bracket 160*a*, 160*b* may be rotated so that the door 100 opens and closes the opened front surface of the tub 10. A portion of the door bracket 160*a*, 160*b* is disposed between the inner door 110 and the first outer door 120.

The door bracket 160*a*, 160*b* includes a first door bracket 162 which is fastened to the inner door 110 and rotatably connected to the tub 10, and a second door bracket 180 which is connected to the first door bracket 162 and fastened to the first outer door 120.

The first door bracket 162 includes a door fastening portion 164 fastened to the door 100, a tub connection portion 166 rotatably connected to the tub 10, and a link connection portion 168 rotatably connected to the first link 310 described below. The first door bracket 162 according to the present embodiment may further include a door fixing portion-connection portion 170 connected to the door fixing portion 390 for maintaining the disposition of the partially opened door 100.

The door fastening portion 164 has a '⊏' shape in cross section when viewed from top, and extends in the length direction of the door 100. The door fastening portion 164 has a shape corresponding to the door bracket fastening groove 114*a*, 114*b* of the inner door 110. Accordingly, the door fastening portion 164 may be inserted into the door bracket fastening groove 114*a*, 114*b* of the inner door 110 and fastened by a separate fastening member (not shown).

The tub connection portion 166 is disposed in a lower side of the door fastening portion 164. The tub connection portion 166 is disposed in the outside of the side surface of the tub 10. The tub connection portion 166 is disposed in the outside of the tub bracket 80*a*, 80*b* disposed on the side surface of the tub 10. The tub connection portion 166 is rotatably connected to the tub bracket 80*a*, 80*b* fastened to the tub 10. The tub connection portion 166 may be connected to the tub bracket 80*a*, 80*b* through a separate hinge member 198. Accordingly, a hinge hole 166*a* into which the hinge member 198 is inserted may be formed in the tub connection portion 166. The hinge hole 166*a* may be formed to extend to the lower side of the first door bracket 162. The hinge hole 166*a* may form a structure extending to the upper side from the lower front end of the first door bracket 162. Accordingly, the first door bracket 162 may be connected to the tub bracket 80*a*, 80*b* to which the hinge is connected in a manner of being inserted through the hinge hole 166*a*. The upper side of the hinge hole 166*a* is formed to have a thickness of the hinge mounted in the tub bracket 80*a*, 80*b*, so that the first door bracket 162 can rotate stably.

Since the tub connection portion 166 is disposed on the door rotating shaft 100*a* on which the door 100 rotates, the position of the tub connection portion 166 is fixed even if the disposition of the door 100 is changed due to the opening or closing of the door 100.

The link connection portion 168 may be disposed in one side of the tub connection portion 166. The link connection portion 168 may rotate clockwise or counterclockwise around the tub connection portion 166 when the door 100 rotates. The link connection portion 168 according to the present embodiment may be disposed at a rear side Tr of the thickness direction (Tf-Tr) of the door from the tub connection portion 166. A first link 310 of the link module 300*a*, 300*b* is rotatably connected to the link connection portion 168. The link connection portion 168 is rotatably connected to a first link-bracket connection portion 318 of the first link 310. The link connection portion 168 may be connected to the first link 310 through a hinge member 380 and a separate fastening member 382.

When the door 100 rotates, the first link-bracket connection portion 318 of the first link 310 moves along the link connection portion 168.

The door fixing portion-connection portion 170 is disposed in the rear Tr of the thickness direction Tf-Tr of the door from the tub connection portion 166. The door fixing portion-connection portion 170 extends to the rear Tr of the thickness direction (Tf-Tr) of the door from the door 100, and is connected to a connection clip 396 of the door fixing portion 390 at a distal end.

The distal end of the door fixing portion-connection portion 170 according to the present embodiment is formed in a hook shape, and the connection clip 386 is fastened to the door fixing portion-connection portion 170 formed in the hook shape, so that the first door bracket 162 and the door fixing portion 380 may be connected.

The door fastening portion 164 extends upward (Lu) of the length direction (Lu-Ld) of the door, based on the tub connection portion 166, and is fastened to the door 100. The door fixing portion-connection portion 170 extends in the rear Tr of the thickness direction (Tf-Tr) of the door, based on the tub connection portion 166, and is connected to the door fixing portion 390 at the distal end.

The first door bracket 162 includes a first bracket fastening portion 172 fastened to the second door bracket 180. The first bracket fastening portion 172 may be fastened to the second bracket fastening portion 194 of the second door bracket 180 fastened to the first outer door 120 through the fastening member 174. The first bracket fastening portion 172 may be disposed in the front Tf of the thickness direction (Tf-Tr) of the door of the door fastening portion 164.

The first door bracket 162 is disposed between the tub bracket 80*a*, 80*b* and the link module 300*a*, 300*b*.

The second door bracket 180 is disposed between the inner door 110 and the first outer door 120. The second door bracket 180 is fastened to the first outer door 120 at the rear of the thickness direction of the door of the first outer door 120. The second door bracket 180 is fastened and fixed to the first door bracket 162 at one side, and is fastened and fixed to the first outer door 120 at the other side. The second door bracket 180 is fastened to the first outer door 120 at the rear of the lower guide 122*a*, 122*b* formed in the first outer door 120 so that the lower holder 210*ad*, 210*bd* are mounted.

The second door bracket 180 may be connected to the first door bracket 162 to distribute the load generated by the cover panel 200 to the first door bracket 162.

The second door bracket 180 according to the present embodiment includes a holder guide portion 182 which is fastened to the rear of the first outer door 120 and guides the movement of the lower holder, and a second bracket fastening portion 194 which extends to the lower side of the holder guide portion 182 and is fastened to the first door bracket 162.

The holder guide portion 182 includes a bracket hole 184 which has a substantially rectangular plate shape and has the lower holder 210*ad*, 210*bd* that moves therein, and an insertion hole 186 into which the lower holder 210*ad*, 210*bd* is inserted. The holder guide portion 182 may include a first surface 188 in contact with the first outer door 120, and a second surface 190 maintaining a gap from the first outer door 120 around the bracket hole 184. The gap between the second surface 190 and the first outer door 120 may be formed as much as a gap of the guide groove 214 formed in the lower holder 210*ad*, 210*bd* described below. When the lower holder 210*ad*, 210*bd* is mounted in the lower guider 122*a*, 122*b*, the first outer door 120 and the second surface 190 of the second door bracket 180 are inserted into the guide groove 214 formed on the side surface of the lower holder 210*ad*, 210*bd*.

A covering protrusion 192 for preventing the erroneous mounting of the lower holder 210*ad*, 210*bd* is formed in the lower side of the insertion hole 186. The covering protrusion 192 may have a structure of covering a gap formed between the first outer door 120 and the second surface 190.

The second bracket fastening portion 194 is disposed in the lower side of the holder guide portion 182, and is fastened to the first door bracket 162. In the second bracket fastening portion 194, a fastening hole 194*a* fastened with the first door bracket 162 by a separate fastening means (not shown) is formed. In the second bracket fastening portion 194, a strength reinforcing rib 195 for reinforcing strength may be formed at a portion fastened to the first door bracket 162. The strength reinforcing ribs 195 may be disposed to be inclined in a direction of being fastened to the first door bracket 162.

<Door Fixing Portion>

Hereinafter, a door fixing portion according to the present embodiment will be described with reference to FIG. 3.

The dishwasher according to the present embodiment includes a door fixing portion 380 that maintains the disposition of the door 100 opened from the tub 10.

The door fixing portion 380 according to the present embodiment may maintain the disposition of the door 100. The door fixing portion 390 is connected to the door bracket 160*a*, 160*b*, and applies an elastic force to the door 100 in a direction opposite to the direction in which the door 100 is opened.

The door fixing portion 380 includes an elastic member 382 that applies an elastic force to the rear of the door 100, a connection member 384 connecting the elastic member 382 and one side of the door 100, and a connecting clip 386 which is disposed in a distal end of the connection member 384 and fastened to the door fixing portion-connection portion 170 of the door bracket 160*a*, 160*b*.

The door fixing portion 380 may further include a friction member 388 for applying a frictional force to the connection member 384. The friction member 388 may expand the range of the parallel relationship of a force generated between the elastic member 382 and the door 100 in which the cover panel 200 is mounted, by applying friction in a direction perpendicular to the direction in which the connection member 384 extends, or in an inclined direction. Accordingly, the door 100 in which the cover panel 200 having a certain weight is mounted can be maintained in a state of being opened from the tub 10 at a certain angle.

The door fixing portion 380 is connected to the door fixing portion-connection portion 170 of the first door bracket 162 fixed to the door 100. The first door bracket 162 is fixedly disposed in the door 100, and the door fixing portion-connection portion 170 is disposed in the door in the rear Td of the thickness direction (Tf-Td) of the door 100. The door fixing portion 380 connected to the first door bracket 162 applies a force rearward (R) downward (D) of the door fixing portion-connection portion 170 formed in the rear end of the first door bracket 162.

<Cover Panel>

Hereinafter, a cover panel according to the present embodiment will be described with reference to FIGS. 4 to 5 and FIGS. 12 to 16.

The cover panel 200 according to the present embodiment is disposed to be movable in the length direction (Lu-Ld) of the door from the front of the door 100. The cover panel 200 according to the present embodiment moves up and down in the length direction (Lu-Ld) of the door 100, when the door 100 rotates. The cover panel 200 has a rectangular plate shape and may cover the door 100 and the front surface of the base 70.

A cover panel fastening member 220 which is mounted in one side of the link module 300*a*, 300*b* and moves the cover panel 200, and a holder 210*au*, 210*bu*, 210*ad*, 210*bd* which is mounted in the door 100 and guides the movement of the cover panel 200 are fastened to the cover panel 200. A plurality of holders 210*au*, 210*bu*, 210*ad*, and 210*bd* and a plurality of cover panel fastening members 220 may be fastened to the rear surface of the cover panel 200. The plurality of holders 210*au*, 210*bu*, 210*ad*, and 210*bd* and the plurality of cover panel fastening portions 220 are fastened to the rear surface of the cover panel 200.

The holder 210*au*, 210*bu*, 210*ad*, 210*bd* according to the present embodiment may include a pair of upper holders 210*au* and 210*bu* mounted in the upper guider 142*a*, 142*b* of the second outer door 140, and a pair of lower holders 210*ad* and 210*bd* mounted in the lower guider 122*a*, 122*b* of the first outer door 120.

The pair of upper holders 210*au* and 210*bu* and the pair of lower holders 210*ad* and 210*bd* according to the present embodiment have the same shape. The pair of upper holders 210*au* and 210*bu* and the pair of lower holders 210*ad* and 210*bd* according to the present embodiment may be classified according to the disposition fastened to the cover panel 200.

The holder 210*au*, 210*bu*, 210*ad*, and 210*bd* according to the present embodiment is composed of a holder body 212 forming a guide groove 214 in both sides. The holder body 212 includes a front body 212*a* forming a surface in contact with the cover panel 200, a rear body 212*b* spaced apart from the front body 212*a* by a certain distance, and a connection body 212*c* for connecting the front body 212*a* and the rear body 212*b*. Since the connection body 212*c* has a width narrower than the front body 212*a* and the rear body 212*b*, a guide groove 214 may be formed between the front body 212*a* and the rear body 212*b*. The guide groove 214 may be formed in both sides of the connection body 212*c*. The guide groove 214 is formed in both sides of the holder body 212 in the length direction of the door.

The connection body 212*c* may have a shape inclined toward the center from an upper end 212*c*1 and a lower end 212*c*2. Therefore, even if the holder 210*au*, 210*bu*, 210*ad*, 210*bd* is fastened to the cover panel 200 in a partially inclined state, it is mounted in the upper guider 142*a*, 142*b* or the lower guider 122*a*, 122*b* and may move up and down (Lu-Ld) in the length direction of the door.

Inside the connection body 212*c*, a fastening hole 216 for fastening with the cover panel 200 is formed, and a strength rib 218 for reinforcing rigidity around the fastening hole 216 may be formed.

The front body 212*a* may be formed to have a narrower thickness than the rear body 212*b*. As the thickness of the front body 212*a* becomes narrower, a gap between the cover panel 200 and the first outer door 120 can be minimized. Inside the rear body 212*b*, a hollow rear body groove 212*d* may be formed.

Figure 11A:
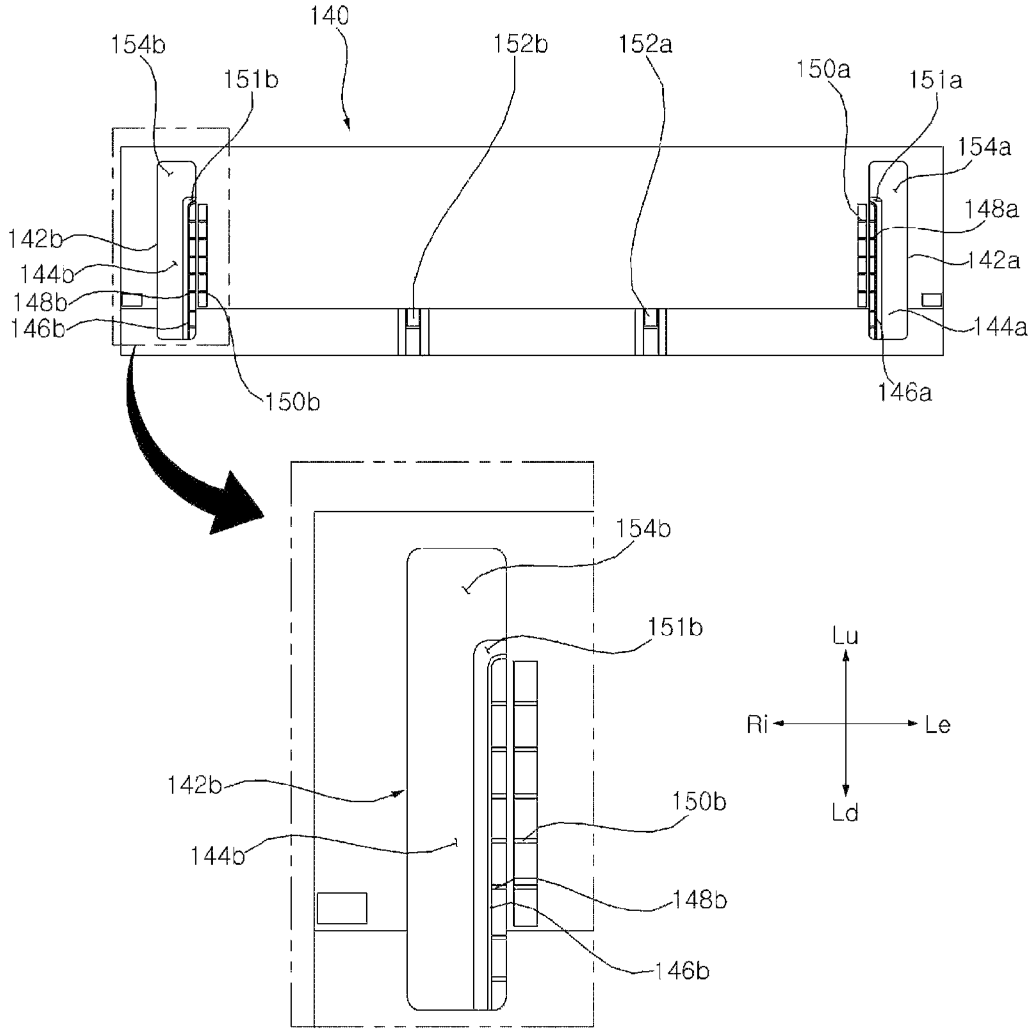
FIG. 11A is a front view of a second outer door according to an embodiment of the present disclosure.
Figure 11B:
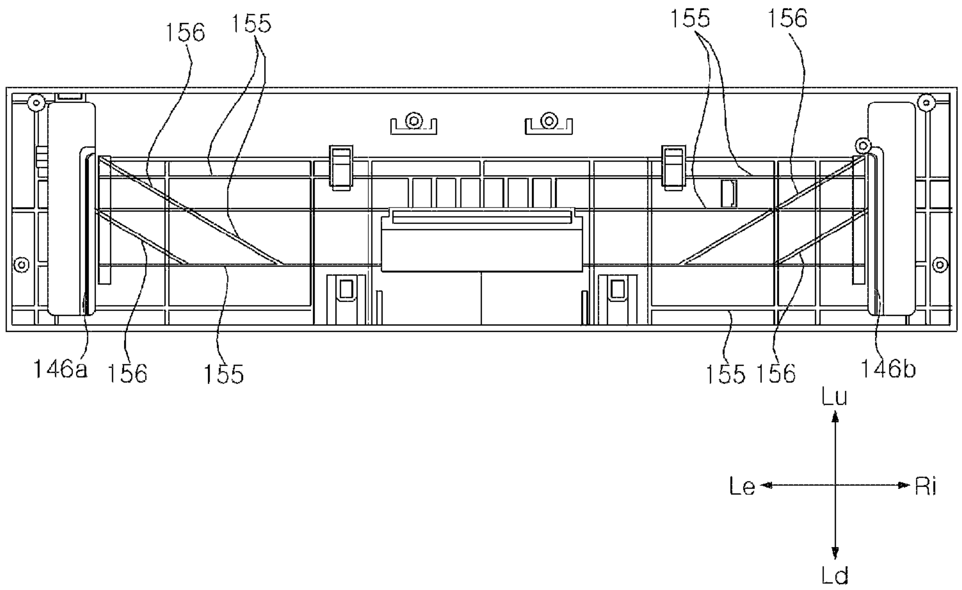
FIG. 11B is a rear view of a second outer door according to an embodiment of the present disclosure.
Figure 12:
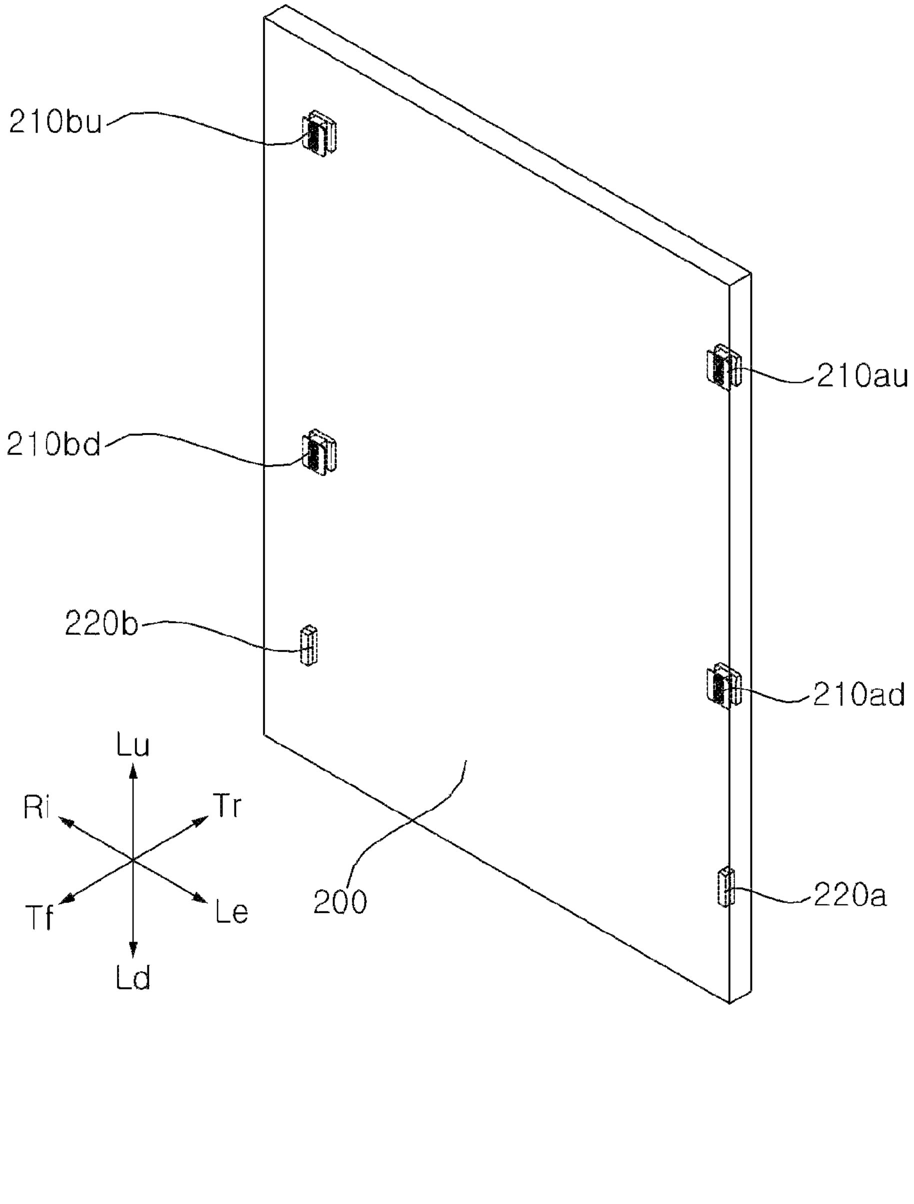
FIG. 12 is a front perspective view of a cover panel on which an upper holder, a lower holder, and a cover panel fastening member are mounted according to an embodiment of the present disclosure.
Figure 13A:
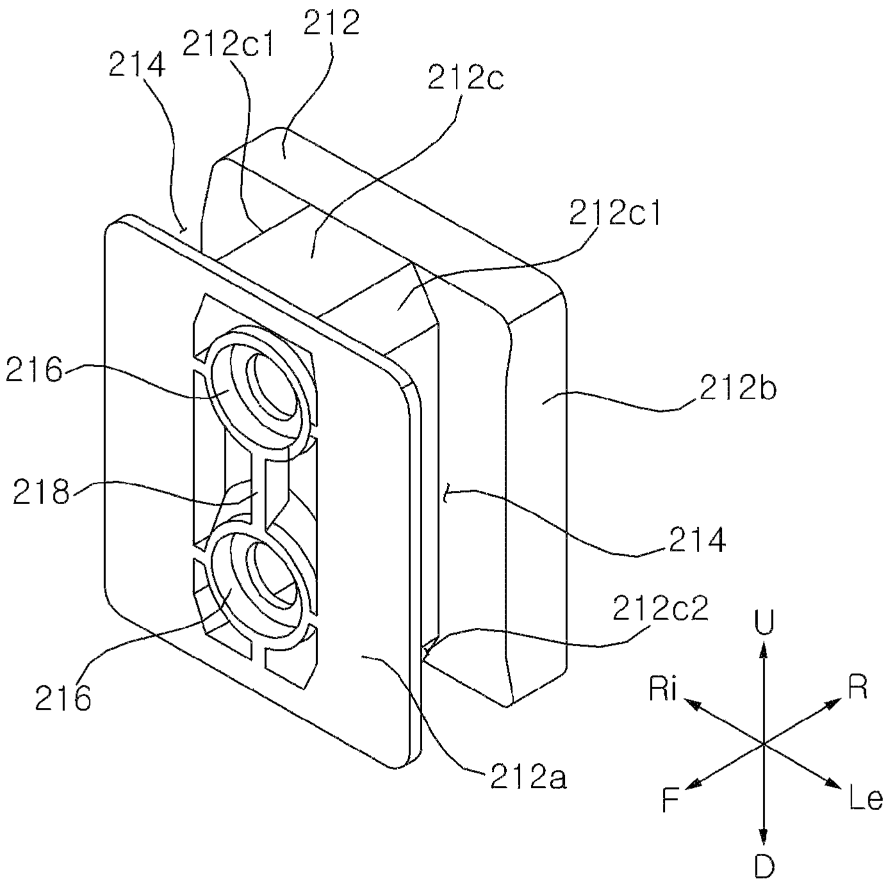
FIG. 13A is a perspective view of an upper holder and a lower holder according to an embodiment of the present disclosure.
Figure 13B:
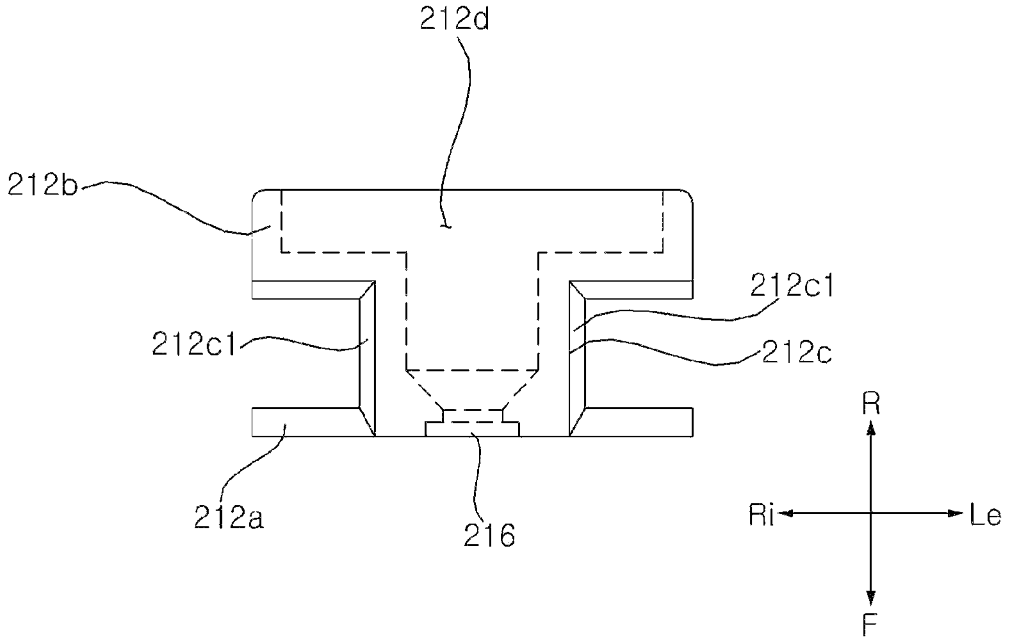
FIG. 13B is a plan view of an upper holder and a lower holder according to an embodiment of the present disclosure.
Figure 14:
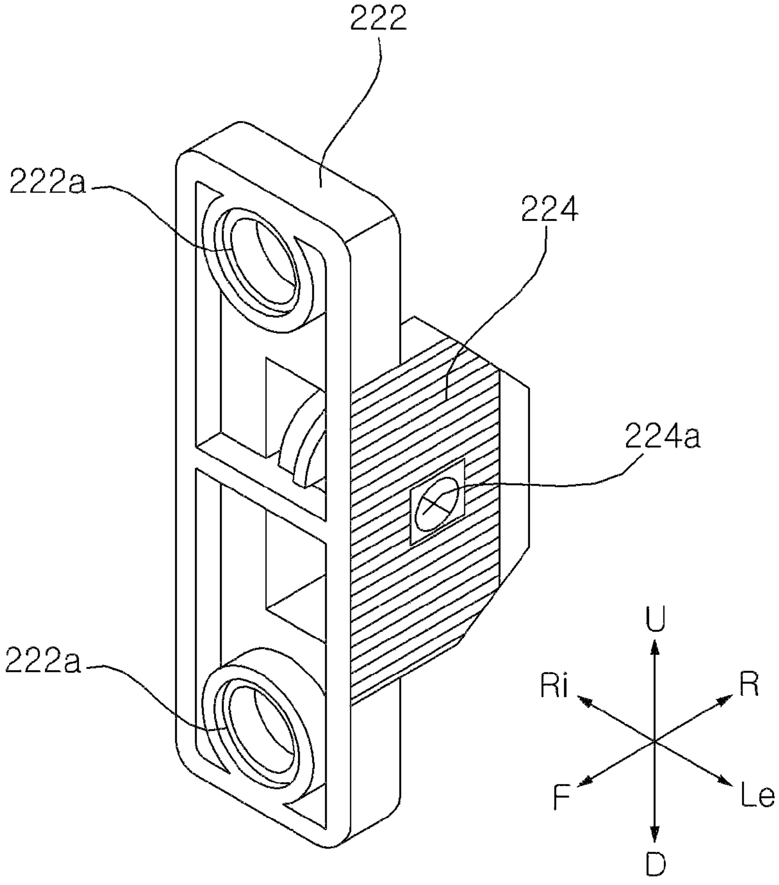
FIG. 14 is a perspective view of a cover panel fastening member according to an embodiment of the present disclosure.
Figure 15:
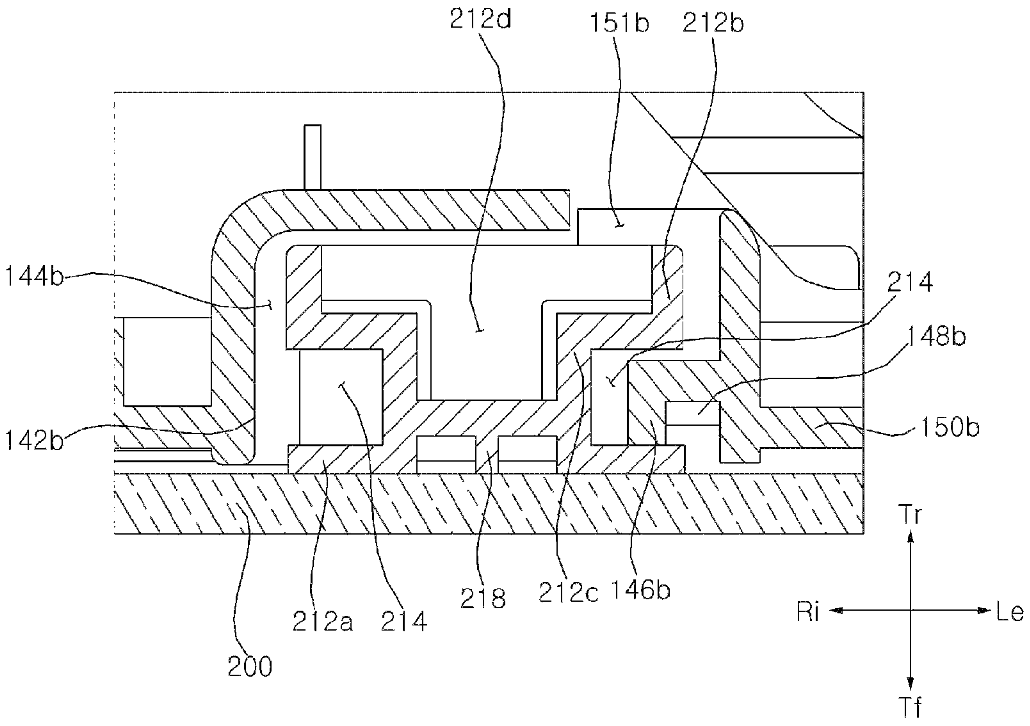
FIG. 15 is a cross-sectional view for explaining a state in which an upper holder is mounted in an upper guider according to an embodiment of the present disclosure.

Referring to FIGS. 11A and 15, a guide rib 146*a*, 146*b* of the upper guider 142*a*, 142*b* may be inserted into the guide grooves 214 of the upper holder 210*au*, 210*bu*. The guide rib 146*a*, 146*b* of the upper guider 142*a*, 142*b* is inserted into only one of the guide grooves 214 in both sides formed in the upper holder 210*au*, 210*bu*. Therefore, since the load of the cover panel 200 is transmitted to one guide rib 146*a*, 146*b*, the cover panel 200 can be supported through the first rigidity reinforcing structures 148*a*, 148*b* and the second rigidity reinforcing structure 150*a*, 150*b*.

Figure 16:
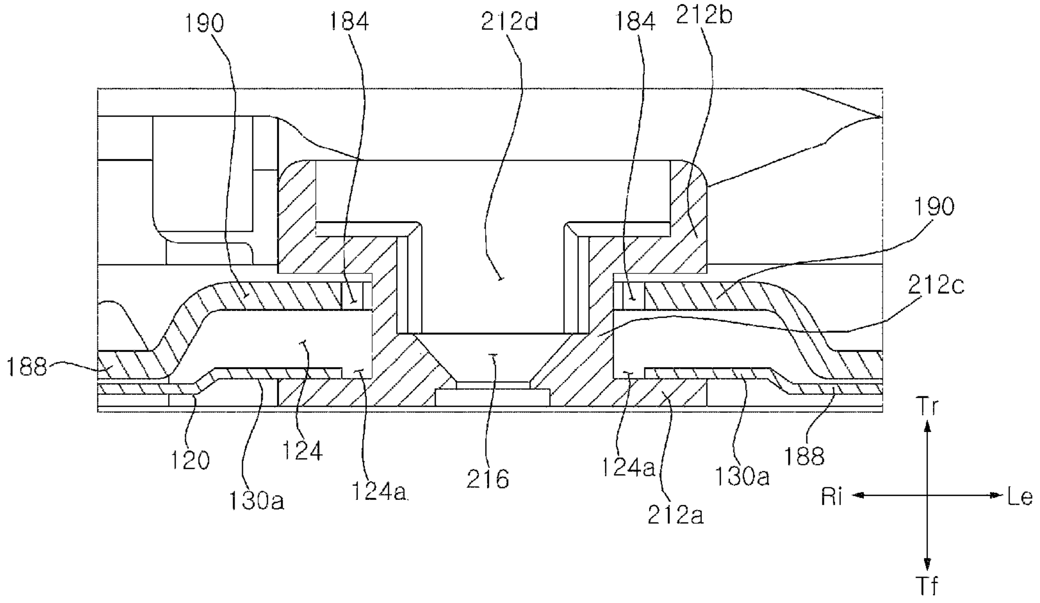
FIG. 16 is a cross-sectional view for explaining a state in which a lower holder is mounted in a lower guider and a second door bracket according to an embodiment of the present disclosure.

Referring to FIG. 16, the first outer door 120 and the second door bracket 180 are inserted into the guide groove 214 of the lower holder 210*ad*, 210*bd*. The first outer door 120 and the second door bracket 180 are inserted into the guide groove 214 formed in both sides of the lower holder 210*ad*, 210*bd*.

The second door bracket 180 is fastened to the first door bracket 162, and the first door bracket 162 is connected to the tub 10 and the door fixing portion 380, thereby supporting the load of the cover panel 200.

The cover panel fastening member 220 may include a pair of cover panel fastening members 220 connected to each of the pair of link modules 300*a* and 300*b*. The cover panel fastening member 220 may be fastened to the rear surface of the cover panel 200 through a separate fastening member 222. In addition, the cover panel fastening member 220 may be fastened to the link holder-fastening portion 346 of the link holder 340 through a separate fastening member 224. The cover panel fastening member 220 may move the position of the cover panel 200 according to the disposition change of the link module 300*a*, 300*b*.

The cover panel fastening member 220 according to the present embodiment includes a panel fastening body 222 that forms a surface opposite to the cover panel 200 and is fastened to the cover panel 200 by a separate fastening means (not shown), and a link fastening body 224 that forms a surface perpendicular to a surface fastened to the cover panel 200 of the panel fastening body 222, and is fastened to the link holder 340.

The panel fastening body 222 may have a panel fastening body hole 222*a* into which a separate fastening means is inserted. The link fastening body 224 is formed in the rear side of the panel fastening body 222, and has a link fastening body hole 224*a* formed to be fastened with the link holder 340 by a separate fastening means (not shown).

The cover panel fastening member 220 is disposed in the lower side of the first outer door 120, or moves in the length direction (Lu-Ld) of the door along the fastening member moving groove 128*a*, 128*b* formed in the first outer door 120. The cover panel fastening member 220 transmits a force according to the disposition change of the link module 300*a*, 300*b*, which is changed according to the rotation of the door 100, to the cover panel 200. When moving by the cover panel fastening member 220, the cover panel 200 moves up and down in the length direction (Lu-Ld) of the door by the upper holder 210*au*, 210*bu* and the lower holder 210*ad*, 210*bd* mounted in the upper guider 142*a*, 142*b* and the lower guider 122*a*, 122*b* of the first outer door 120.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. A dishwasher comprising:

a tub that defines a space for washing dishes, the tub having an open side;

a base that is disposed at a lower side of the tub and that separates the tub from a floor surface;

a door configured to open and close the open side of the tub;

a door bracket that is fastened to the door and that is rotatably connected to the tub;

a cover panel that covers the door and a side of the base, the cover panel being movably disposed at the door;

a link module configured to move the cover panel in a length direction of the door based on rotation of the door;

an upper holder that is fastened to a side of the cover panel and that is movably mounted in the door; and a lower holder that is spaced apart from the upper holder to a lower side of the upper holder, that is fastened to the side of the cover panel, and that is movably mounted in the door; and a cover panel fastening member that is spaced apart from the lower holder to a lower side of the lower holder and that is connected to the link module to move the cover panel, wherein the door comprises:

an upper guider configured to guide movement of the cover panel disposed in front of the door, the upper holder being mounted to the upper guider, a lower guider configured to guide movement of the cover panel, wherein the lower holder is mounted to the lower guider, and a lower side of the upper guider is disposed in the lower guider, and a fastening member moving groove that is defined at a lower side of the lower guider and that accommodates the cover panel fastening member, and wherein the door bracket is fastened to a rear of the lower guider.

2. The dishwasher of claim 1, wherein the door comprises:

an inner door that is in contact with the open side of the tub, the inner door being configured to open and close the tub;

a first outer door that is fastened to a front of the inner door, the lower guider being disposed at the first outer door; and a second outer door that is disposed at an upper side of the first outer door and that is fastened to the inner door, the upper guider being disposed at the second outer door, and wherein the cover panel is mounted in each of the first outer door and the second outer door and configured to move in the length direction of the door.

3. The dishwasher of claim 2, wherein the door bracket is fastened to each of the first outer door and the inner door and located between the first outer door and the inner door.

4. The dishwasher of claim 2, wherein the door bracket comprises:

a first door bracket that is rotatably coupled to the tub; and a second door bracket that is fastened to the first outer door at a rear of the lower guider, the second door bracket having one side that is fastened to the first door bracket.

5. The dishwasher of claim 4, wherein the first door bracket comprises:

a tub connection portion rotatably connected to a lower end of the tub;

a door fastening portion that extends from the tub connection portion and that is fastened to the inner door; and a link connection portion that is disposed at a rear side of the door from the tub connection portion, wherein the link module is connected to link connection portion and configured to move the cover panel.

6. The dishwasher of claim 5, further comprising a door fixing portion configured to maintain position of the door that is opened from the tub by applying force to the door in a direction opposite to a load acting on the door, wherein the first door bracket further comprises a door fixing portion-connection portion that extends from the tub connection portion to a rear side of the door and that is connected to the door fixing portion.

7. The dishwasher of claim 6, wherein the door fixing portion comprises:

an elastic member configured to apply elastic force to a rear of the door;

a connection member that connects the elastic member to the door; and a connection clip that is disposed at a distal end of the connection member and that is fastened to the door fixing portion-connection portion.

8. The dishwasher of claim 4, wherein the lower guider defines a guide hole that extends in the length direction of the door, wherein the second door bracket defines a bracket hole that extends in the length direction of the door, the bracket hole being defined at a position corresponding to the guide hole, and wherein the lower holder is mounted in the guide hole of the lower guider and in the bracket hole of the second door bracket.

9. The dishwasher of claim 8, wherein the first outer door defines a lower holder insertion hole at an upper side of the guide hole, the lower holder insertion hole receiving the lower holder, wherein a width of the lower holder insertion hole is greater than a width of the guide hole in a width direction of the door, wherein the second door bracket defines an insertion hole at an upper side of the bracket hole, wherein a size of the insertion hole corresponds to the width of the lower holder insertion hole, and wherein the second door bracket comprises a covering protrusion that protrudes from a lower end of the insertion hole in a direction of the first outer door and that covers a gap between the first outer door and the second door bracket.

10. The dishwasher of claim 2, wherein the upper guider comprises:

an upper guide groove that extends in the length direction of the door and that receives the upper holder; and a guide rib that protrudes from one side of the upper guide groove and that is configured to guide movement of the upper holder.

11. The dishwasher of claim 10, wherein the guide rib comprises a plurality of first rigidity reinforcing structures that are disposed in a width direction of the door and that are configured to reinforce rigidity of the guide rib, and wherein the plurality of first rigidity reinforcing structures are spaced apart from each other in the length direction of the door.

12. The dishwasher of claim 10, wherein the second outer door comprises a plurality of second rigidity reinforcing structures that are disposed at one side of the guide rib and that are disposed in a width direction of the door, and wherein the plurality of second rigidity reinforcing structures are spaced apart from each other in the length direction of the door.

13. The dishwasher of claim 2, wherein each of the upper holder and the lower holder comprises:

a front body that defines a surface in contact with the cover panel;

a rear body that is spaced apart from the front body in a direction of the inner door; and a connection body connects the front body and the rear body, wherein a width of the connection body is less than widths of each of the front body and the rear body, and wherein the connection body has a shape inclined in a center direction from an upper end portion and a lower end portion.

14. The dishwasher of claim 1, wherein each of the upper holder and the lower holder is mounted in the door and separates the door and the cover panel.

* * * * *